(12) United States Patent
Daniluk et al.

(10) Patent No.: US 12,309,559 B2
(45) Date of Patent: May 20, 2025

(54) METHOD AND DEVICE FOR PROCESSING AUDIO SIGNAL BY USING ARTIFICIAL INTELLIGENCE MODEL

(71) Applicant: SAMSUNG ELECTRONICS CO., LTD., Suwon-si (KR)

(72) Inventors: Paweł Daniluk, Warsaw (PL); Jakub Tkaczuk, Warsaw (PL); Mateusz Matuszewski, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 110 days.

(21) Appl. No.: 17/993,666

(22) Filed: Nov. 23, 2022

(65) Prior Publication Data
US 2023/0171543 A1 Jun. 1, 2023

Related U.S. Application Data

(63) Continuation of application No. PCT/KR2022/018124, filed on Nov. 16, 2022.

(30) Foreign Application Priority Data

Nov. 26, 2021 (KR) .................. 10-2021-0166102

(51) Int. Cl.
*H04R 3/04* (2006.01)

(52) U.S. Cl.
CPC ........... *H04R 3/04* (2013.01); *H04R 2420/07* (2013.01)

(58) Field of Classification Search
CPC .. H04B 17/309; H04B 17/318; H04B 17/345; H04B 17/29; H04B 17/3913; H04B 17/40; H04L 1/0002; H04L 1/0009; H04L 1/0041; H04L 1/18; H04L 5/0064; H04L 67/1097; H04L 67/12; H04L 1/0076; H04L 67/562;

(Continued)

(56) References Cited

U.S. PATENT DOCUMENTS 10,269,343 B2 * 4/2019 Wingate .................. G10L 15/22
10,685,663 B2 * 6/2020 Karkkainen ............. H04R 3/00
(Continued)

FOREIGN PATENT DOCUMENTS

| CN | 114007169 A | 2/2022 |
|----|-------------|--------|
| KR | 10-2065030 B1 | 3/2020 |

OTHER PUBLICATIONS

Kwiatkowska, et al. "Deep Learning Based Open Set Acoustic Scene Classification", Aug. 2020, 5 pages total, arXiv:2008.07247v1 [eess.AS].

(Continued)

*Primary Examiner* — Lun-See Lao
(74) *Attorney, Agent, or Firm* — Sughrue Mion, PLLC

(57) ABSTRACT

A method of processing an audio signal includes: obtaining an audio signal; transmitting the obtained audio signal to an external electronic device; receiving, from the external electronic device, second information for adjusting a third artificial intelligence model configured to process an audio signal in real time; inputting the received second information and the obtained audio signal to the third artificial intelligence model to adjust the third artificial intelligence model; inputting the obtained audio signal to the adjusted third artificial intelligence model to obtain a processed audio signal; and reproducing the processed audio signal.

18 Claims, 13 Drawing Sheets

(58) Field of Classification Search
CPC ....... H04L 67/566; H04L 1/0057; H04L 1/16;
H04L 1/1854; H04L 1/1867; H04L
1/1874; H04L 27/0014; H04L 41/084;
H04L 41/142; H04L 41/145; H04L
41/147; H04L 41/149; H04L 41/16; H04L
43/024; H04L 5/0008; H04L 67/125;
H04L 67/306; H04L 69/08; H04W 4/38;
H04W 4/70; H04W 52/16; H04W 52/246;
H04W 52/362; G10L 21/0208; G10L
21/0216; H04N 19/172; H04N 19/184;
H04R 1/1016; H04R 2420/07; H04R
3/04; H04R 3/12; H04R 5/04
USPC .......................................................... 700/94
See application file for complete search history.

(56) References Cited

U.S. PATENT DOCUMENTS

| | | | |
|---|---|---|---|
| 11,048,472 | B2 | 6/2021 | Boeen et al. |
| 2019/0082276 | A1 | 3/2019 | Crow et al. |
| 2019/0369946 | A1* | 12/2019 | Foerster .................. G06N 3/045 |
| 2021/0105565 | A1* | 4/2021 | Pedersen .................. G06N 3/08 |
| 2021/0119930 | A1* | 4/2021 | Debbage ............... H04L 1/1642 |
| 2021/0158837 | A1* | 5/2021 | Saki ......................... G10L 25/78 |
| 2021/0327402 | A1 | 10/2021 | Xie et al. |
| 2022/0238128 | A1 | 7/2022 | Chi et al. |

OTHER PUBLICATIONS

Kosmider, "Spectrum Correction: Acoustic Scene Classification with Mismatched Recording Devices", Oct. 2020, Interspeech, 5 pages total.

Kapka, et al., "Sound source detection, localization and classification using consecutive ensemble of CRNN models", Oct. 2019, Detection and Classification of Acoustic Scenes and Events, 5 pages total, arXiv:1908.00766v2 [eess.AS].

Rakowski, et al., "Frequency-Aware CNN for Open Set Acoustic Scene Classification", Oct. 2019, Detection and Classification of Acoustic Scenes and Events, 3 pages total.

Kosmider, "Calibrating Neural Networks for Secondary Recording Devices", Oct. 2019, Detection and Classification of Acoustic Scenes and Events, 3 pages total.

Drossos, et al., "Sound Event Detection with Depthwise Separable and Dilated Convolutions", Feb. 2020, 8 pages total, arXiv:2002.00476v1 [cs.SD].

Drossos et al., "Language Modelling for Sound Event Detection with Teacher Forcing and Scheduled Sampling", Nov. 2019, Detection and Classification of Acoustic Scenes and Events, 5 pages total, arXiv:1907.08506v3 [cs.SD].

Kong, et al., "PANNs: Large-Scale Pretrained Audio Neural Networks for Audio Pattern Recognition", Aug. 2020, 15 pages total, arXiv:1912.10211v5 [cs.SD].

International Search Report and Written Opinion (PCT/ISA/220, PCT/ISA/210, and PCT/ISA/237) dated Mar. 2, 2023, issued by International Searching Authority for International Application No. PCT/KR2022/018124.

Li et al., "A Smart Binaural Hearing Aid Architecture Leveraging a Smartphone APP With Deep-Learning Speech Enhancement", Special Section on IEEE Engineering in Medicine and Biology Society Section, IEEE Access, Mar. 20, 2020, pp. 56798-56810, vol. 8.

Bhat et al., "A Real-Time Convolutional Neural Network Based Speech Enhancement for Hearing Impaired Listeners Using Smartphone", IEEE Access, Jun. 12, 2019, pp. 78421-78433, vol. 7.

Kavalekalam et al., "Model-based Speech Enhancement for Intelligibility Improvement in Binaural Hearing Aids", Journal of Latex Class Files, arXiv:1806.04885v2, Oct. 1, 2018, pp. 1-14, vol. 14.

Chern et al., "A Smartphone-Based Multi-Functional Hearing Assistive System to Facilitate Speech Recognition in the Classroom", IEEE Access, Jun. 5, 2017, pp. 10339-10351, vol. 5.

Communication dated Nov. 12, 2024, issued by European Patent Office in European Patent App. No. 22898941.4.

\* cited by examiner

10

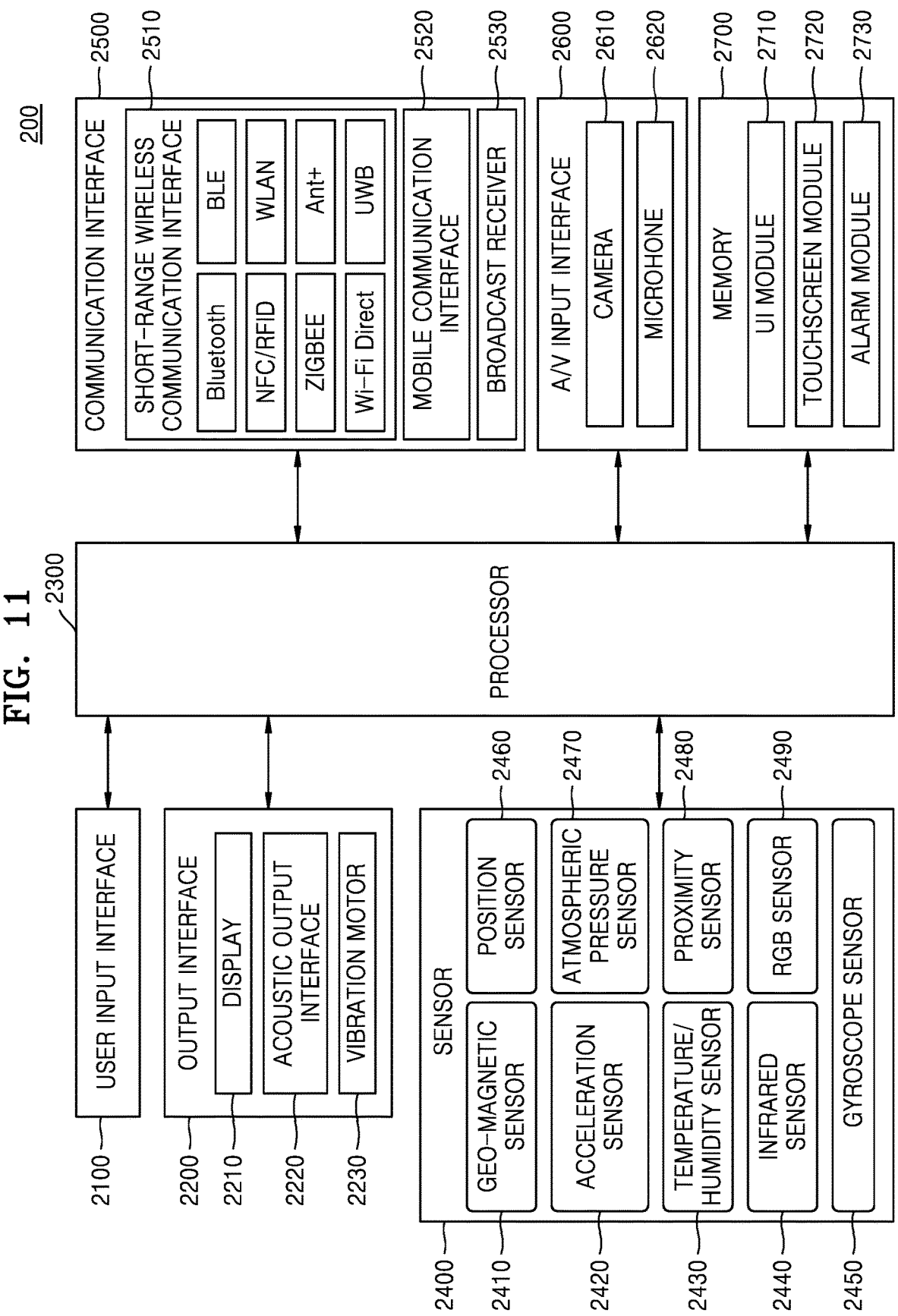

METHOD AND DEVICE FOR PROCESSING AUDIO SIGNAL BY USING ARTIFICIAL INTELLIGENCE MODEL

CROSS-REFERENCE TO RELATED APPLICATION(S)

This application is a bypass continuation of PCT International Application No. PCT/KR2022/018124, which was filed on Nov. 16, 2022, and claims priority to Korean Patent Application No. 10-2021-0166102, filed on Nov. 26, 2021, in the Korean Intellectual Property Office, the disclosures of which are incorporated by reference herein in their entirety.

BACKGROUND

1. Field

The disclosure relates to a method and device for processing an audio signal. More particularly, the disclosure relates to a method and device for processing an audio signal by using an artificial intelligence model.

2. Description of Related Art

With the development of digital technology, various types of electronic devices such as a mobile communication terminal, a smartphone, a tablet personal computer (PC), a personal digital assistant (PDA), an electronic organizer, a laptop PC, a wearable device, an Internet of Things (IoT) device, and an audible device are being widely used.

An electronic device may be connected to various types of audio playback devices (e.g., a wired speaker, wired headphones, wired earphones, a wireless speaker, wireless headphones, wireless earphones, and the like). The electronic device may output, through a connected audio playback device, audio data (e.g., a sound source) to be played back, and a user may listen to the audio data of the electronic device through the audio playback device. The electronic device and the audio playback device may be connected via a wired interface (e.g., connector connection) or a wireless interface (e.g., Bluetooth connection).

Recently, demand for an intelligent audio playback device having an audio signal processing function such as noise self-cancellation has increased. However, because the available power and computation capability of an audio playback device are not high, there are limitations with respect to executing a complicated audio signal processing technique. As such, a method of processing an audio signal in an electronic device, e.g., a smartphone or the like, paired with an audio playback device and then transmitting the processed audio signal to the audio playback device may be used, but this technique has a drawback of high latency.

SUMMARY

According to an aspect of the disclosure, there is provided a method of processing an audio signal, the method including: obtaining, by a first electronic device, an audio signal; transmitting, by the first electronic device, the obtained audio signal to a second electronic device; inputting, by the second electronic device, the obtained audio signal to a first artificial intelligence model to obtain first information for adjusting a second artificial intelligence model configured to process the obtained audio signal with lower latency than the first artificial intelligence model; inputting, by the second electronic device, the obtained first information and the obtained audio signal to the second artificial intelligence model to obtain second information for adjusting a third artificial intelligence model configured to process the obtained audio signal in real time; transmitting the obtained second information from the second electronic device to the first electronic device; inputting, by the first electronic device, the obtained second information and the obtained audio signal to the third artificial intelligence model to adjust the third artificial intelligence model; inputting, by the first electronic device, the obtained audio signal to the adjusted third artificial intelligence model to obtain a processed audio signal; and reproducing, by the first electronic device, the processed audio signal.

According to another aspect of the disclosure, there is provided a method of processing an audio signal, the method including: obtaining an audio signal; transmitting the obtained audio signal to an external electronic device; receiving, from the external electronic device, information for adjusting an artificial intelligence model configured to process the obtained audio signal in real time; inputting the received information and the obtained audio signal to the artificial intelligence model to adjust the artificial intelligence model; inputting the obtained audio signal to the adjusted artificial intelligence model to obtain a processed audio signal; and reproducing the processed audio signal.

According to another aspect of the disclosure, there is provided a method of processing an audio signal, the method including: receiving, from an audio signal reproduction device, an audio signal obtained by the audio signal reproduction device; inputting the obtained audio signal to a first artificial intelligence model to obtain first information for adjusting a second artificial intelligence model configured to process the obtained audio signal with lower latency than the first artificial intelligence model; inputting the obtained first information and the obtained audio signal to the second artificial intelligence model to obtain second information for adjusting a third artificial intelligence model configured to process the obtained audio signal in real time; and transmitting the obtained second information to the audio signal reproduction device to adjust the third artificial intelligence model.

According to another aspect of the disclosure, there is provided a system for processing an audio signal, the system including: a first electronic device; and a second electronic device, wherein the first electronic device may be further configured to: obtain an audio signal through a microphone, and transmit the obtained audio signal to the second electronic device through a communication interface, wherein the second electronic device may be configured to: input the audio signal transmitted from the first electronic device to a first artificial intelligence model to obtain first information for adjusting a second artificial intelligence model configured to process the obtained audio signal with lower latency than the first artificial intelligence model, input the obtained first information and the obtained audio signal to the second artificial intelligence model to obtain second information for adjusting a third artificial intelligence model configured to process the obtained audio signal in real time, and transmit the obtained second information to the first electronic device through the communication interface, and wherein the first electronic device may be further configured to: input the obtained second information and the obtained audio signal to the third artificial intelligence model to adjust the third artificial intelligence model, input the obtained audio signal to the adjusted third artificial intelligence model to obtain a processed audio signal, and reproduce the processed audio signal through a speaker.

According to another aspect of the disclosure, there is provided an electronic device for reproducing an audio signal, the electronic device including: a microphone; a speaker; a communication interface configured to communicate with an external electronic device; a memory configured to store instructions; and at least one processor functionally coupled to the microphone, the speaker, the communication interface, and the memory, wherein the at least one processor is configured to, by executing the instructions: obtain an audio signal through the microphone, transmit the obtained audio signal to the external electronic device through the communication interface, receive, from the external electronic device through the communication interface, information for adjusting an artificial intelligence model configured to process the obtained audio signal in real time, input the received information and the obtained audio signal to the artificial intelligence model to adjust the artificial intelligence model, input the obtained audio signal to the adjusted artificial intelligence model to obtain a processed audio signal, and reproduce the processed audio signal through the speaker.

According to another aspect of the disclosure, there is provided an electronic device for processing an audio signal, the electronic device including: a communication interface configured to communicate with an audio signal reproduction device; a memory configured to instructions; and at least one processor functionally coupled to the communication interface and the memory, wherein the at least one processor is configured to, by executing the instructions: receive, through the communication interface, an audio signal obtained by the audio signal reproduction device, input the obtained audio signal to a first artificial intelligence model to obtain first information for adjusting a second artificial intelligence model configured to process the obtained audio signal with low latency than the first artificial intelligence model, input the obtained first information and the obtained audio signal to the second artificial intelligence model to obtain second information for adjusting a third artificial intelligence model configured to process the obtained audio signal in real time, and transmit the obtained second information to the audio signal reproduction device through the communication interface.

BRIEF DESCRIPTION OF DRAWINGS

FIG. 11 is a block diagram of an electronic device for processing an audio signal, according to various example embodiments of the disclosure.

DETAILED DESCRIPTION

Figure 1:
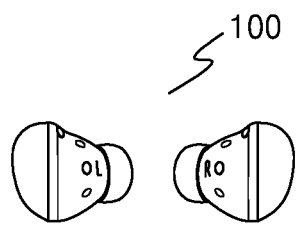
FIG. 1 is a schematic diagram of a system for processing an audio signal, according to an example embodiment of the disclosure.
Figure 1:
Figure 1:
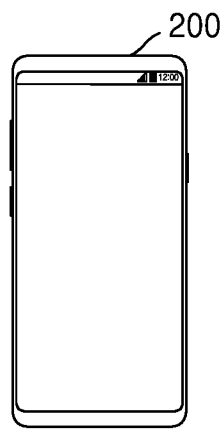

Hereinafter, various example embodiments of the disclosure are described with reference to the accompanying drawings.

The terminology used in the disclosure is used only to describe specific embodiments of the disclosure and may not have any intention to limit the scope of other embodiments of the disclosure. An expression in the singular includes an expression in the plural unless they are clearly different from each other in context. All terms used herein including technical or scientific terms may have the same meaning as those generally understood by those of ordinary skill in the art. It should be understood that terms generally used, which are defined in a dictionary, among terms used in the disclosure have the same meaning as in context of related technology, and the terms are not to be understood as having an ideal or excessively formal meaning unless they are clearly defined in the disclosure. According to circumstances, it may be understood that even terms defined in the disclosure do not exclude embodiments in the disclosure.

Throughout the disclosure, the expression "at least one of a, b or c" indicates only a, only b, only c, both a and b, both a and c, both b and c, all of a, b, and c, or variations thereof.

An electronic device according to various example embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. According to various example embodiments of the disclosure, the wearable device may include at least one of an accessory type device (e.g., a watch, a ring, a bracelet, a anklet, a necklace, glasses, a contact lens, earphones, headphones, a head-mounted device (HMD), or the like), a fabric or clothing integrated device (e.g., electronic clothing), a body-attached device (e.g., a skin pad or a tattoo), or a body-implanted device (e.g., an implantable circuit).

According to example embodiments of the disclosure, the electronic device may be a home appliance. The home appliance may include at least one of, for example, a television (TV), a digital video disk (DVD) player, an audio player, a refrigerator, an air conditioner, a vacuum, an oven, a microwave oven, a washing machine, an air cleaner, a set-top box, a home automation control panel, a security control panel, a TV box (e.g., SAMSUNG HomeSync™,), a game console, an electronic dictionary, an electronic key, a camcorder, or an electronic frame.

In another embodiment of the disclosure, the electronic device may include at least one of various kinds of medical devices (e.g., various kinds of portable medical measurement devices (a blood glucose monitor, a heart rate monitor, a blood pressure measuring instrument, a thermometer, and the like), a magnetic resonance angiography (MRA) device, a magnetic resonance imaging (MRI) device, a computed tomography (CT) device, an imaging machine, an ultrasonic machine, and the like), a navigation device, a global navigation satellite system (GNSS), an event data recorder (EDR), a flight data recorder (FDR), a vehicle infotainment device, marine electronic equipment (e.g., a marine navigation device, a gyrocompass, and the like), avionics, a security device, a vehicle head unit, an industrial or home robot, an automatic teller machine (ATM) of a financial institute, a point of sales (POS) terminal in a store, or Internet of Things (IoT) devices (e.g., a bulb, various kinds of sensors, an electric or gas meter, a sprinkler device, a fire alarm, a thermostat, a streetlight, a toaster, exercise equipment, a hot water tank, a heater, a boiler, and the like).

According to a certain embodiment of the disclosure, the electronic device may include at least one of a portion of furniture or a building/structure, an electronic board, an electronic signature receiving device, a projector, or various kinds of meters (e.g., a water meter, an electricity meter, a gas meter, an electronic wave meter, and the like).

In various example embodiments of the disclosure, the electronic device may be one or a combination of two or more of the various devices described above. According to a certain embodiment of the disclosure, the electronic device may be a flexible electronic device. In addition, the electronic device according to an example embodiment of the disclosure is not limited to the devices described above and may include new devices according to technology development.

Artificial intelligence (AI) systems are computer systems for implementing human-level intelligence, and unlike existing rule-based smart systems, AI systems get smarter while a machine self-learns and self-determines. The more an AI system is used, the more the AI system's recognition rate improves and the more the AI system can accurately understand user preferences, and thus, existing rule-based smart systems are gradually being replaced with deep learning-based AI systems.

AI technology includes machine learning (deep learning) using an algorithm of self-classifying/self-learning features of input data, and element technologies of simulating functions such as recognition and determination of the human brain by utilizing a machine learning algorithm.

Machine learning is an algorithm technology of self-classifying/self-learning features of input data. Element technologies may include at least one of a linguistic understanding technology of recognizing human languages/characters, a visual understanding technology of recognizing a thing like human vision, an inference/prediction technology of determining information and performing logical inference and prediction, a knowledge representation technology of processing human experience information as knowledge data, or a motion control technology of controlling autonomous driving of a vehicle and a motion of a robot. Linguistic understanding is a technology of recognizing and applying/processing human languages/characters and includes natural language processing, machine translation, conversation system, query response, voice recognition/synthesis, and the like.

A function associated with AI according to the disclosure may be executed using a processor and a memory. The processor may include one or more processors. In this case, the one or more processors may include a general-purpose processor such as a central processing unit (CPU), an application processor (AP), or a digital signal processor (DSP), a graphics-dedicated processor such as a graphics processing unit (GPU) or a vision processing unit (VPU), or an AI-dedicated processor such as a neural processing unit (NPU). The one or more processors may control to process input data according to a pre-defined operating rule or AI model stored in the memory. Alternatively, when the one or more processors include an AI-dedicated processor, the AI-dedicated processor may be designed to a hardware structure specified to process a particular AI model.

The pre-defined operating rule or AI model may be created through training. Herein, creating through training indicates that a basic AI model is trained by a learning algorithm by using a plurality of pieces of learning data, to create the pre-defined operating rule or AI model configured to perform a desired characteristic (or purpose). This training may be self-performed in a device in which an AI function according to the disclosure is executed, or performed through a separate server and/or system. Examples of the learning algorithm may include a supervised learning algorithm, an unsupervised learning algorithm, a semi-supervised learning algorithm, and a reinforcement learning algorithm, but are not limited thereto.

The AI model may include a plurality of neural network layers. The plurality of neural network layers have a plurality of weight values, respectively, and perform a neural network operation through computation between an operation result of a previous layer and the plurality of weight values. The plurality of weight values which the plurality of neural network layers have may be optimized by a training result of the AI model. For example, the plurality of weight values may be updated during a training process to decrease or minimize a loss value or a cost value obtained by the AI model. An artificial neural network may include a deep neural network (DNN), for example, a convolutional neural network (CNN), a DNN, a recurrent neural network (RNN), a restricted Boltzmann machine (RBM), a deep belief network (DBN), a bidirectional recurrent deep neural network (BRDNN), a Deep Q-Network, or the like but is not limited thereto.

FIG. 1 is a schematic diagram of a system for processing an audio signal, according to an example embodiment of the disclosure.

Referring to FIG. 1, the system 10 for processing an audio signal may include a first electronic device 100 and a second electronic device 200.

The first electronic device 100 may be a device configured to play back audio. In various example embodiments of the disclosure, the first electronic device 100 may be a mobile device which a user may carry. In various example embodiments of the disclosure, the first electronic device 100 may be a wearable device wearable on the body of the user. In various example embodiments of the disclosure, the first electronic device 100 may be a smart device having an audio self-processing function. For example, the first electronic device 100 may be a true wireless (TWS) device, a hearable device, intelligent earbuds, intelligent headphones, or an AI speaker. Obviously, the first electronic device 100 is not limited thereto.

In various example embodiments of the disclosure, the first electronic device 100 may receive an audio signal corresponding to a sound obtained from the outside of the first electronic device 100, through a microphone included as part of the first electronic device 100. In an example embodiment of the disclosure, the first electronic device 100 may be connected to the second electronic device 200 directly through a connection terminal or wirelessly through a wireless communication module (e.g., Bluetooth communication) and transmit an audio signal obtained by the first electronic device 100 to the second electronic device 200 or receive an audio signal from the second electronic device 200. According to an example embodiment of the disclosure, the first electronic device 100 may receive, from the second electronic device 200, a control signal (e.g., a volume control signal received through an input button) associated with an audio signal to be obtained. According to an example embodiment of the disclosure, the first electronic device 100 may receive information associated with audio signal processing from the second electronic device 200.

In various example embodiments of the disclosure, the first electronic device 100 may variously process the received audio signal. For example, the first electronic device 100 may perform sampling rate change, application of one or more filters, interpolation processing, amplification or attenuation of a total or partial frequency band, noise processing (e.g., noise or echo attenuation), channel change (e.g., switching between mono and stereo), mixing, or designated signal extraction on one or more audio signals.

According to an example embodiment of the disclosure, one or more audio signal processing functions of the first electronic device 100 may be implemented by a DSP. According to an example embodiment of the disclosure, the one or more audio signal processing functions of the first electronic device 100 may be implemented by an NPU.

In various example embodiments of the disclosure, the first electronic device 100 may output an audio signal to the outside through a speaker as sound. The speaker may include, for example, a dynamic driver or a balanced armature driver. According to an example embodiment of the disclosure, the first electronic device 100 may include a plurality of speakers. In this case, the first electronic device 100 may output an audio signal having a plurality of different channels (e.g., stereo or 5.1 channel) through at least some of the plurality of speakers.

The second electronic device 200 may be a device configured to process audio. In various example embodiments of the disclosure, the second electronic device 200 may be a device capable of controlling the first electronic device 100. In various example embodiments of the disclosure, the second electronic device 200 may be a mobile device which the user may carry. For example, the second electronic device 200 may include at least one of a smartphone, a tablet PC, a mobile phone, an e-book reader, a laptop PC, a netbook computer, a PDA, a PMP, or an MP3 player. Obviously, the second electronic device 200 is not limited thereto.

In various example embodiments of the disclosure, the second electronic device 200 may be connected to the first electronic device 100 directly through a connection terminal or wirelessly through a wireless communication module (e.g., Bluetooth communication) and receive an audio signal from the first electronic device 100 or transmit an audio signal to the first electronic device 100. According to an example embodiment of the disclosure, the second electronic device 200 may transmit, to the first electronic device 100, a control signal (e.g., a volume control signal received through an input button) associated with an audio signal to be transmitted. According to an example embodiment of the disclosure, the second electronic device 200 may transmit information associated with audio signal processing to the first electronic device 100.

In various example embodiments of the disclosure, the second electronic device 200 may variously process an audio signal. For example, the second electronic device 200 may perform sampling rate change, application of one or more filters, interpolation processing, amplification or attenuation of a total or partial frequency band, noise processing (e.g., noise or echo attenuation), channel change (e.g., switching between mono and stereo), mixing, or designated signal extraction on one or more audio signals.

The system for processing an audio signal, according to various example embodiments of the disclosure, may perform audio signal processing for various purposes. In an example embodiment of the disclosure, the system for processing an audio signal may analyze an environment, a context, or a condition in which an electronic device is used, to determine which audio signal processing is to be performed. For example, the system for processing an audio signal may perform at least one of sound separation, sound enhancement, selective listening, active noise cancelation, acoustic echo cancelation, ambient pass-through, beamforming, or selective filtering by processing an audio signal. For example, the system for processing an audio signal, according to the disclosure, may perform at least one of voice fingerprinting, sound event detection such as wake-up spotting and emergency sound detection, acoustic scene analysis, or listening target selection by analyzing an audio signal.

According to various example embodiments of the disclosure, the first electronic device 100 and the second electronic device 200 may be functionally coupled and operate to process an audio signal. In various example embodiments of the disclosure, the first electronic device 100 and the second electronic device 200 may separately perform operations for audio signal processing. In various example embodiments of the disclosure, the first electronic device 100 and the second electronic device 200 may perform different types of audio signal processing, respectively. For example, the first electronic device 100 may perform processing requiring few computation resources, and the second electronic device 200 may perform processing requiring many computation resources. According to an example embodiment, the first electronic device 100 may perform processing that requires first amount of computation resources and the second electronic device 200 may perform processing that requires second amount of computation resources, where the first amount of computation resources is less than the second amount of computation resources. For example, the first electronic device 100 may perform real-time signal processing or signal processing requiring low latency, and the second electronic device 200 may perform signal processing which operates for a relatively long period or is not much concerned about latency. According to an example embodiment, the first electronic device 100 may perform real-time signal processing or signal processing requiring first latency amount or less (i.e., low latency), and the second electronic device 200 may perform signal processing which operates for a relatively long period or at a latency (i.e., high latency) that is higher than the first latency amount.

According to various example embodiments of the disclosure, each of the first electronic device 100 and the second electronic device 200 may use an AI model to process an audio signal. Examples of a method of processing an audio signal by using an AI model are described in more detail with reference to FIGS. 2A to 7.

Figure 2A:
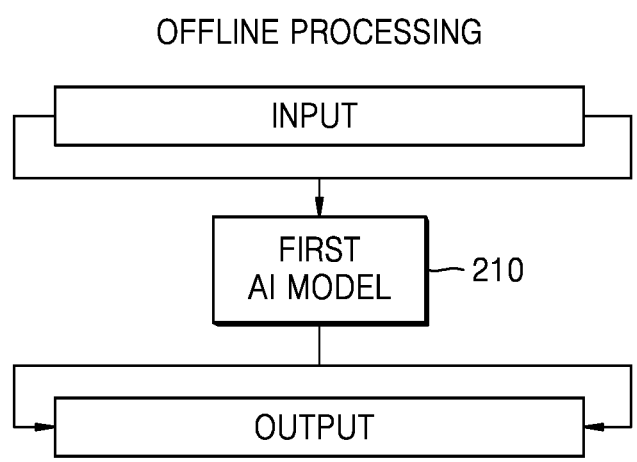
FIG. 2A is a drawing for describing an operation of a first artificial intelligence model configured to process an audio signal, according to an example embodiment of the disclosure.
Figure 2B:
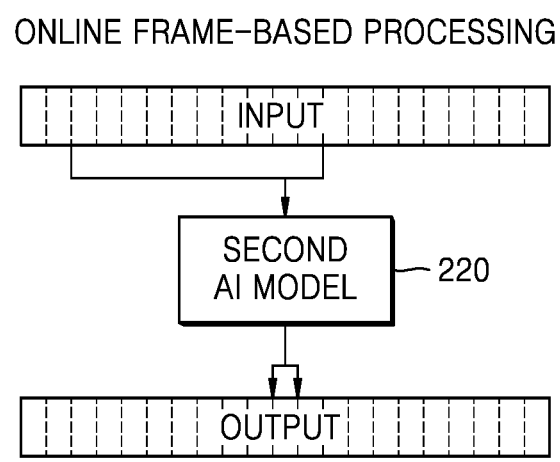
FIG. 2B is a drawing for describing an operation of a second artificial intelligence model configured to process an audio signal, according to an example embodiment of the disclosure.
Figure 2C:
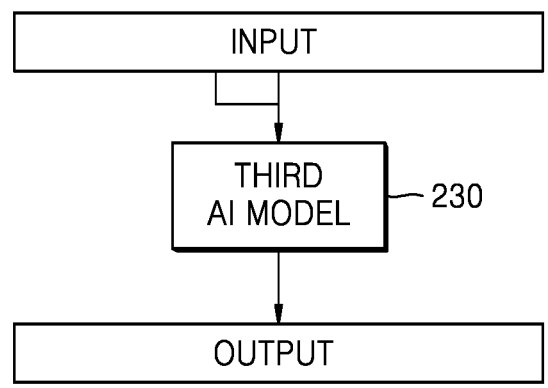
FIG. 2C is a drawing for describing an operation of a third artificial intelligence model configured to process an audio signal, according to an example embodiment of the disclosure.

FIGS. 2A, 2B and 2C illustrate various example embodiments of AI models configured to process an audio signal.

The AI models configured to process an audio signal may operate in different time scales according to the purposes thereof. According to a representation type and an estimation time of an AI model, data latency for the AI model to collect data may be determined. The higher a complexity of an AI model, the higher the model latency for the AI model to process data. The larger the size of input/output data, the longer an estimation time, and the higher the complexity, the more an AI model may be applied to a relatively general situation, but latency may be higher. On the contrary, an AI model of which input/output data is small, an estimation time is short, and a complexity is low may be trained only for a particular task, but may be used for real-time processing because of low latency.

Referring to FIG. 2A, a first AI model 210 for offline processing is illustrated.

The first AI model 210 is an AI model configured to receive and process a total audio signal. The first AI model 210 may be an AI model having a high complexity and high latency. In an example embodiment of the disclosure, the first AI model 210 may be a versatile model applicable to a random acoustic environment.

In an example embodiment of the disclosure, data which may be input to and output from the first AI model 210 may be designated to have an arbitrary size. That is, the first AI model 210 may process audio data collected for an arbitrary time. For example, the first AI model 210 may receive one or more audio clips and output one or more processed audio clips. Therefore, the first AI model 210 may have an arbitrary data latency. In an example embodiment of the disclosure, a time for audio signal processing by the first AI model 210 may be longer than a time for data collection. In this case, data to be input to the first AI model 210 may be recorded in advance before input. Therefore, the first AI model 210 may have an arbitrary model latency and be used for signal processing of which the latency is not significant.

In an example embodiment of the disclosure, the first AI model 210 may include a model (e.g., a bidirectional long short-term memory (LSTM)) depending on both a past signal and a future signal. In an example embodiment of the disclosure, the first AI model 210 may require a large data set for training due to the high complexity thereof. Therefore, the first AI model 210 may be previously trained and then installed in an electronic device in which the first AI model 210 is to be used.

The first AI model 210 may be an AI model trained to perform at least one of, for example, voice fingerprinting, acoustic scenes classification, sound event detection, listening target selection, sound separation, sound enhancement, or speech embedding.

Referring to FIG. 2B, a second AI model 220 for online frame-based processing is illustrated.

The second AI model 220 may be an AI model configured to receive and process frame-unit audio data. Herein, a frame indicates a spectrum obtained as a result of fast Fourier transform (FFT) for a certain time window. The second AI model 220 may be an AI model having a medium complexity and low latency. The second AI model 220 may be a model adapted or trained for a particular user or a current acoustic environment.

In an example embodiment of the disclosure, the second AI model 220 may receive audio data of one or more frames. For example, the second AI model 220 may receive a spectrogram of an audio signal and output short-time Fourier transform (STFT)-applied audio data of a single-frame. Therefore, the second AI model 220 may have data latency as high as at least a frame length (e.g., about 25 ms). In an example embodiment of the disclosure, the second AI model 220 may process an audio signal at about a same rate as data is collected. For example, the second AI model 220 may have a model latency of about 10 ms to about 40 ms. Therefore, the second AI model 220 may be used for online (real-time) signal processing, but an output signal may be delayed by at least a single-frame length with respect to an input signal.

In an example embodiment of the disclosure, the second AI model 220 may be trained by user data of an electronic device. For example, the second AI model 220 may be trained by a user's voice sample, device correction, and the like. Therefore, the second AI model 220 may be trained in advance and then installed in an electronic device, or may be continuously trained and updated during use of the electronic device.

The second AI model 220 may be an AI model trained to perform at least one of, for example, selective listening, voice fingerprinting, wake-up spotting, or emergency sound detection.

Referring to FIG. 2C, a third AI model 230 for online sample-based processing is illustrated.

The third AI model 230 is an AI model configured to receive and process sample-unit audio data. Herein, a sample indicates a single value of a time domain signal. The third AI model 230 may be an AI model having a low complexity and a low latency. The third AI model 230 may be an AI model trained to perform a particular function in a particular acoustic environment. In an example embodiment of the disclosure, the third AI model 230 may include an adaptive filter.

In an example embodiment of the disclosure, the third AI model 230 may receive audio data of one or more samples. For example, the third AI model 230 may receive several samples and output audio data of one sample. Therefore, the third AI model 230 may have no data latency or have a data latency as short as a single-sample length. In an example embodiment of the disclosure, the third AI model 230 may process an audio signal at about a same rate as data is collected. For example, the third AI model 230 may have a model latency of about 1 ms or less. Therefore, the third AI model 230 may be used for real-time signal processing.

In an example embodiment of the disclosure, the third AI model 230 may be trained by user data of an electronic device. Therefore, the third AI model 230 may be trained in advance and then installed in an electronic device, or may be continuously trained and updated during use of the electronic device.

The third AI model 230 may be an AI model trained to perform at least one of, for example, selective listening, active noise cancellation, acoustic echo cancellation, ambient pass-though, beamforming, or adaptive filtering.

In an example embodiment of the disclosure, a large AI model, e.g., the first AI model 210 or the second AI model 220, may be installed and operate in not an audio playback device but an external electronic device according to computation resource requirement. For example, the external electronic device may process an audio signal by using an AI model and transmit information associated with the audio signal processing or a processed audio signal to the audio playback device. In an example embodiment of the disclosure, a small AI model, e.g., the second AI model 220 or the third AI model 230, may be installed in the audio playback device and used for real-time processing. For example, the audio playback device may process a received audio signal in real time by using an AI model and reproduce the processed audio signal.

Figure 3:
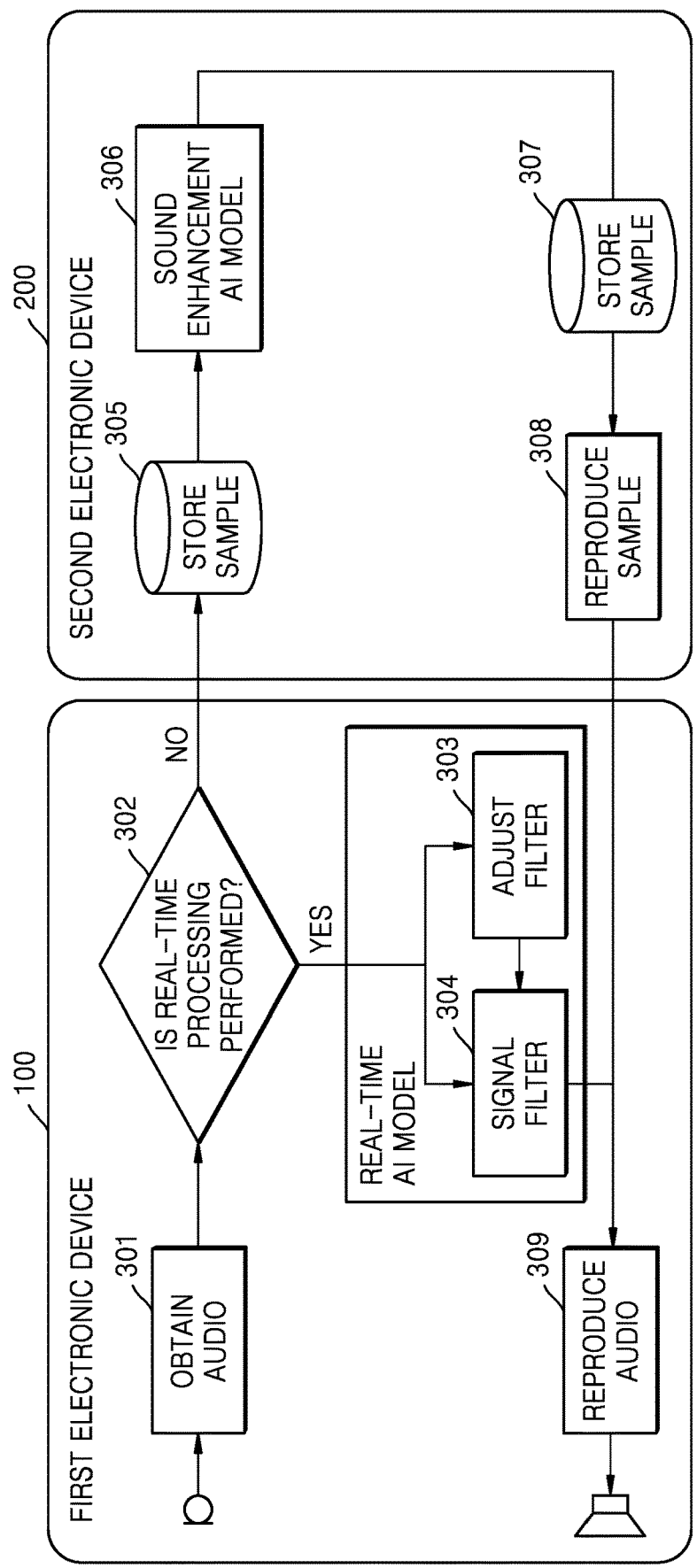
FIG. 3 is a block diagram for describing an operation of a system for processing an audio signal, according to an example embodiment of the disclosure.

FIG. 3 is a block diagram for describing an operation of a system for processing an audio signal, according to an example embodiment. The first electronic device 100 and the second electronic device 200 shown in FIG. 3 may correspond to the first electronic device 100 and the second electronic device 200 shown in FIG. 1, respectively.

Referring to FIG. 3, in operation 301, the first electronic device 100 may obtain an audio signal. In an example embodiment, the first electronic device 100 may collect an audio signal. In an example embodiment of the disclosure, the first electronic device 100 may capture a sound from outside the first electronic device 100 through a microphone included as a portion of the first electronic device 100. Here, the captured sound may be converted to an audio signal. In an example embodiment of the disclosure, the first electronic device 100 may receive an audio signal from the second electronic device 200 or another external electronic device. In an example embodiment of the disclosure, the first electronic device 100 may mix a plurality of audio signals into at least one audio signal.

In operation 302, the first electronic device 100 may determine whether to process the obtained audio signal in real time. In an example embodiment of the disclosure, whether to process an audio signal in real time may be determined according to a target audio signal processing function. For example, when a signal processing function such as selective listening, active noise cancellation, acoustic echo cancellation, ambient pass-though, or adaptive filtering is supposed to be performed, the first electronic device 100 may determine that the obtained audio signal is processed in real time. However, the first electronic device 100 is not limited thereto. In an example embodiment of the disclosure, whether to process an audio signal in real time may be determined based on a user input. For example, when the user activates a signal processing function such as selective listening, active noise cancellation, acoustic echo cancellation, ambient pass-though, or adaptive filtering of the first electronic device 100, the first electronic device 100 may determine that the obtained audio signal is processed in real time.

When it is determined that the obtained audio signal is processed in real time, in operation 303, the first electronic device 100 may adjust a signal filter for real-time processing. In an example embodiment of the disclosure, the first electronic device 100 may adjust a filter coefficient according to a target audio signal processing function. In an example embodiment of the disclosure, the filter coefficient may be adjusted to perform the target function, that is, to obtain a desired output from a given audio signal input. For example, when a beamforming function is performed, the filter coefficient may be adjusted to obtain an effect of separating audio signals by applying an appropriate delay to an input signal. As another example, when a selective listening function is performed, the filter coefficient may be adjusted to separate a desired voice by extracting a particular frequency in a frequency domain through filtering. In an example embodiment of the disclosure, the first electronic device 100 may adjust the filter coefficient according to a characteristic of the obtained audio signal.

When it is determined that the obtained audio signal is processed in real time, in operation 304, the first electronic device 100 may obtain an audio signal processed by applying a filter to the obtained audio signal.

In an example embodiment of the disclosure, the filter applied in operation 304 may be an AI model (e.g., the third AI model 230 shown in FIG. 2C) capable of performing real-time processing. In this case, the filter adjustment in operation 303 may indicate that the AI model is trained by using the obtained audio signal. In an example embodiment of the disclosure, training and application of the AI model in operations 303 and 304 may be performed in real time.

When it is determined that the obtained audio signal is not processed in real time, the first electronic device 100 may transmit the obtained audio signal to the second electronic device 200. In operation 305, the second electronic device 200 may store, for processing thereafter, a sample of the audio signal received from the first electronic device 100. In an example embodiment of the disclosure, the storing may be short-time storing for processing in an online model (e.g., the second AI model 220 shown in FIG. 2B) having low data latency (i.e., second data latency). In another example embodiment of the disclosure, the storing may be long-time storing for processing in an offline model (e.g., the first AI model 210 shown in FIG. 2A) having high data latency (i.e., first data latency). Here, the second data latency may be lower than the first data latency.

In operation 306, the second electronic device 200 may input the stored sample of the audio signal to a sound enhancement AI model to obtain a processed audio signal. In an example embodiment of the disclosure, the sound enhancement AI model may include an AI model (e.g., the first AI model 210 shown in FIG. 2A) configured to process an audio signal offline. In an example embodiment of the disclosure, the sound enhancement AI model may include an AI model (e.g., the second AI model 220 shown in FIG. 2B) configured to process an audio signal with low latency. In an example embodiment of the disclosure, the sound enhancement AI model may be trained in advance and installed in the second electronic device 200.

In operation 307, the second electronic device 200 may store a sample of the processed audio signal for reproduction thereafter. In an example embodiment of the disclosure, the storing may be storing for an online processing disabled model (e.g., the first AI model 210 shown in FIG. 2A).

In operation 308, the second electronic device 200 may reproduce the processed audio signal. In an example embodiment of the disclosure, the second electronic device 200 may transmit the processed audio signal to the first electronic device 100.

In operation 309, the first electronic device 100 may reproduce the processed audio signal through a speaker. The processed audio signal may be an audio signal processed by the first electronic device 100 in real time when it is determined that the obtained audio signal is processed in real time, and an audio signal processed and then transmitted by the second electronic device 200 when it is determined that the obtained audio signal is not processed in real time.

Figure 4:
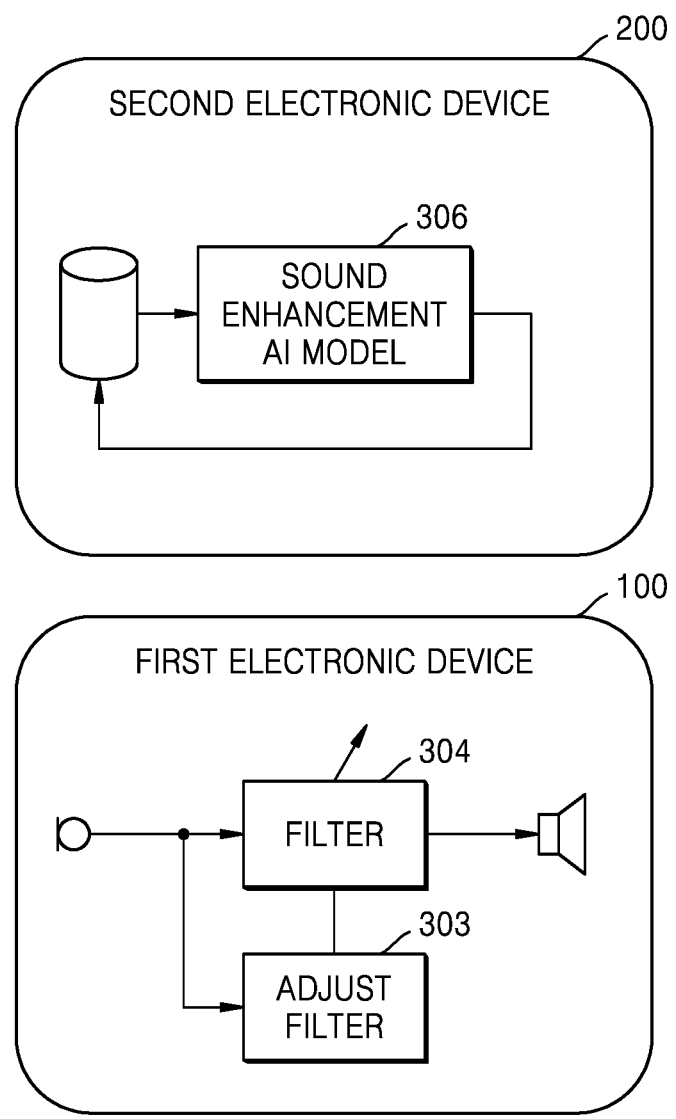
FIG. 4 is a block diagram for describing an operation of a system for processing an audio signal, according to an example embodiment of the disclosure.

FIG. 4 is a block diagram for describing an operation of a system for processing an audio signal, according to an example embodiment. The first electronic device 100 and the second electronic device 200 shown in FIG. 4 may correspond to the first electronic device 100 and the second electronic device 200 shown in FIG. 1, respectively.

Referring to FIG. 4, operations of the system for processing an audio signal, which is shown in FIG. 3, are more briefly shown. In the first electronic device 100, an obtained audio signal may be processed in real time by a filter 304, and the processed audio signal may be reproduced. In the second electronic device 200, a stored audio signal may be processed by a sound enhancement AI model 306 offline or with low latency, and the processed audio signal may be stored for reproduction thereafter. According to an example embodiment of the disclosure, an audio signal collected by the first electronic device 100 may be transmitted to the second electronic device 200 and stored for processing, and an audio signal processed by the second electronic device 200 may be transmitted to the first electronic device 100 and reproduced.

However, according to the example embodiment described above, the filter 304 of the first electronic device 100 cannot use a result of signal processing performed by the sound enhancement AI model 306 of the second electronic device 200. In addition, because the filter 304 of the first electronic device 100 cannot perform a complex function, the filter 304 may perform only a simple function. Meanwhile, the sound enhancement AI model 306 of the second electronic device 200 may perform a more complex advanced signal processing function but cannot perform real-time signal processing. The first electronic device 100 cannot reproduce in real time an audio signal processed by the second electronic device 200 due to a communication latency between the first electronic device 100 and the second electronic device 200 and model latencies of the first electronic device 100 and the second electronic device 200.

To solve the problem described above, in various example embodiments of the disclosure, a method of efficiently obtaining audio data of relatively high quality by using, in a small and specialized model, information obtained by a large versatile model is proposed.

Figure 5:
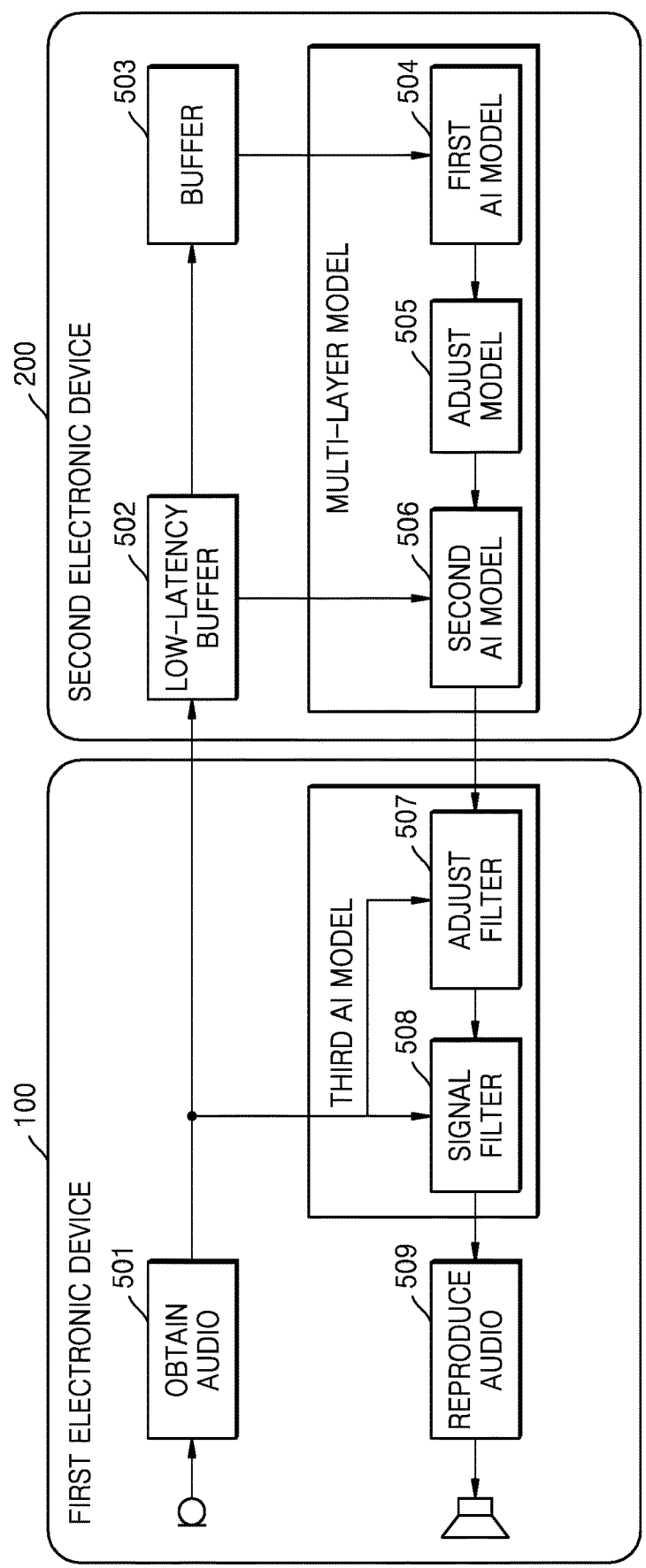
FIG. 5 is a block diagram for describing an operation of a system for processing an audio signal, according to an example embodiment of the disclosure.

FIG. 5 is a block diagram for describing an operation of a system for processing an audio signal, according to an example embodiment. The first electronic device 100 and the second electronic device 200 shown in FIG. 5 may correspond to the first electronic device 100 and the second electronic device 200 shown in FIG. 1, respectively.

Referring to FIG. 5, the first electronic device 100 may include a third AI model configured to process an audio signal in real time. In an example embodiment of the disclosure, the third AI model may correspond to the third AI model 230 shown in FIG. 2C. In an example embodiment of the disclosure, the third AI model may be trained in advance and installed in the first electronic device 100. The second electronic device 200 may include a multi-layer model including a first AI model configured to process an audio signal offline and a second AI model configured to process an audio signal with lower latency than the first artificial intelligence model. In an example embodiment of the disclosure, the first AI model and the second AI model may correspond to the first AI model 210 shown in FIG. 2A and the second AI model 220 shown in FIG. 2B, respectively. In an example embodiment of the disclosure, the first AI model and the second AI model may be trained in advance and installed in the second electronic device 200.

In operation 501, the first electronic device 100 may obtain an audio signal. In an example embodiment of the disclosure, the first electronic device 100 may capture a sound outside the first electronic device 100 through a microphone. The microphone may be included in the first electronic device 100. In an example embodiment of the disclosure, the first electronic device 100 may receive an audio signal from the second electronic device 200 or an external other electronic device. In an example embodiment of the disclosure, the first electronic device 100 may mix a plurality of audio signals into at least one audio signal.

The first electronic device 100 may transmit the obtained audio signal to the second electronic device 200. In operation 502, the second electronic device 200 may store, in a low-latency buffer 502 for processing thereafter, a sample of the audio signal received from the first electronic device 100. In an example embodiment of the disclosure, the storing may be short-time storing for processing in the second AI model configured to process an audio signal with low latency. For example, the low-latency buffer may store an audio sample for calculation of a spectrum to be input to the second AI model, i.e., an audio sample corresponding to a certain time window.

In operation 503, the second electronic device 200 may store, in a buffer for processing thereafter, the sample of the audio signal received from the first electronic device 100. The storing may be long-time storing for processing in the first AI model configured to process an audio signal offline. For example, the buffer may store an audio sample corresponding to an audio clip to be input to the first AI model. For example, the buffer may store an audio sample for a certain time.

In operation 504, the second electronic device 200 may input the audio signal stored in the buffer to the first AI model to obtain first information for adjusting the second AI model. In an example embodiment of the disclosure, the first information may include an audio signal processed in the first AI model. In an example embodiment of the disclosure, the first information may include information about a task to be performed in the second AI model. In an example embodiment of the disclosure, the first information may include a target signal to be output from the second AI model to achieve a target function in the second AI model. In an example embodiment of the disclosure, the first information may include information indicating an acoustic environment.

In operation 505, the second electronic device 200 may adjust the second AI model by using the first information. In an example embodiment of the disclosure, the second electronic device 200 may train or adapt the second AI model by using the first information. In an example embodiment of the disclosure, the second AI model may be trained to process an input audio signal and output the target signal provided as the first information. In an example embodiment of the disclosure, the second electronic device 200 may provide an ambient condition to the second AI model by using the first information.

In an example embodiment of the disclosure, the second electronic device 200 may obtain the first information based on fullness of the buffer, and adjust the second AI model by using the first information. In an example embodiment of the disclosure, the second electronic device 200 may obtain the first information based on detection of a change in the acoustic environment, and adjust the second AI model by using the first information. In an example embodiment of the disclosure, the second electronic device 200 may obtain the first information periodically (e.g., every 1 to 5 seconds), and adjust the second AI model by using the first information. In an example embodiment of the disclosure, the acquisition of the first information may be continuously performed, and the adjustment of the second AI model by using the first information may be periodically performed based on satisfaction of a certain condition.

In operation 506, the second electronic device 200 may input the obtained first information and the audio signal stored in the low-latency buffer to the second AI model to obtain second information for adjusting a signal filter, i.e., the third AI model, of the first electronic device 100.

In an example embodiment of the disclosure, the second information may include an audio signal processed in the second AI model. In an example embodiment of the disclosure, the second information may include information about a task to be performed in the signal filter. In an example embodiment of the disclosure, the second information may include a target signal to be output from the signal filter to achieve a target function in the signal filter. In an example embodiment of the disclosure, the second information may include the information indicating the acoustic environment.

The second electronic device 200 may transmit the obtained second information to the first electronic device 100. In operation 507, the first electronic device 100 may adjust the signal filter by using the obtained second information and the obtained audio signal.

In an example embodiment of the disclosure, the first electronic device 100 may train the signal filter, i.e., the third AI model, by using the second information. The third AI model may be trained to process an input audio signal and output the target signal provided as the second information. In an example embodiment of the disclosure, the first electronic device 100 may provide an ambient condition to the third AI model by using the second information. In an example embodiment of the disclosure, the second information may be used to select at least one of an initial weight value of the third AI model, a filter length, a filter coefficient, other aspect of a filter architecture, or an adaptation method and a hyper parameter thereof.

In an example embodiment of the disclosure, the second electronic device 200 may obtain the second information based on fullness of the low-latency buffer and transmit the second information to the first electronic device 100. In an example embodiment of the disclosure, the second electronic device 200 may obtain the second information periodically (e.g., every 100 to 500 ms) and transmit the second information to the first electronic device 100. In an example embodiment of the disclosure, the second electronic device 200 may continuously obtain the second information and transmit the second information to the first electronic device 100. In an embodiment of the disclosure, the adjustment of the signal filter by using the second information may be performed based on reception of the second information or continuously. In an example embodiment of the disclosure, the adjustment of the signal filter by using the second information may be performed in real time.

In operation 508, the first electronic device 100 may input the obtained audio signal to the adjusted signal filter to obtain a processed audio signal. In operation 509, the first electronic device 100 may reproduce, through a speaker, the audio signal processed in the signal filter.

Figure 6:
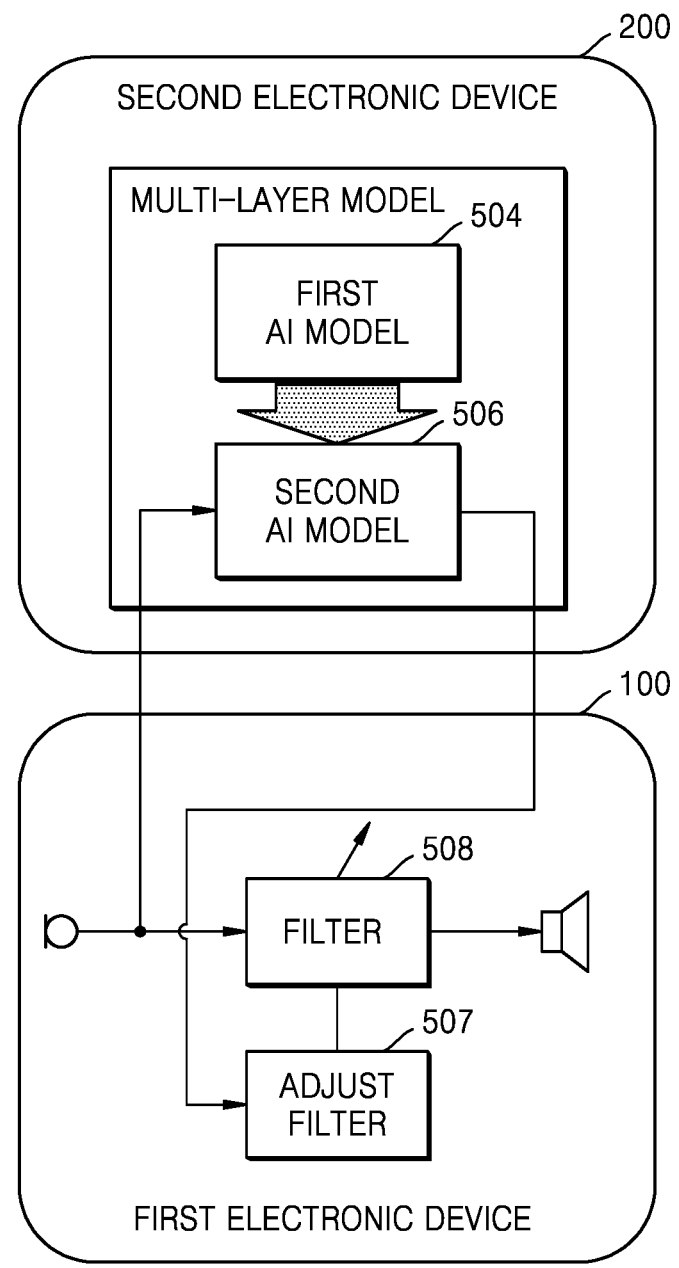
FIG. 6 is a block diagram for describing an operation of a system for processing an audio signal, according to an example embodiment of the disclosure.

FIG. 6 is a block diagram for describing an operation of a system for processing an audio signal, according to an example embodiment. The first electronic device 100 and the second electronic device 200 shown in FIG. 6 may correspond to the first electronic device 100 and the second electronic device 200 shown in FIG. 1, respectively.

Referring to FIG. 6, operations of the system for processing an audio signal, which is shown in FIG. 5, are more briefly shown. An audio signal collected by the first electronic device 100 may be transmitted to the second electronic device 200 and used to obtain, from a multi-layer model of the second electronic device 200, information for adjusting a real-time filter. The multi-layer model of the second electronic device 200 may include a first AI model (operation 504) for offline processing and a second AI model (operation 506) for low-latency processing. An output of the first AI model (operation 504) may be used for training and adaptation of the second AI model (operation 506), and an output of the second AI model (operation 506) may be transmitted to the first electronic device 100 and used to adjust (operation 507) the real-time filter (operation 508) of the first electronic device 100.

According to the example embodiment described above, information or knowledge obtained in a complex and slow high-level AI model may be transmitted to a simple and fast low-level AI model and used for training and adaptation. Therefore, the system for processing an audio signal, according to embodiments of the disclosure, may obtain a high-quality processed audio signal by using a result obtained from a high-performance AI model while maintaining low latency. In addition, because the high-level AI model is executed in the second electronic device 200 having high computation capability, a power use amount of the first electronic device 100 may be maintained to be low.

Figure 7:
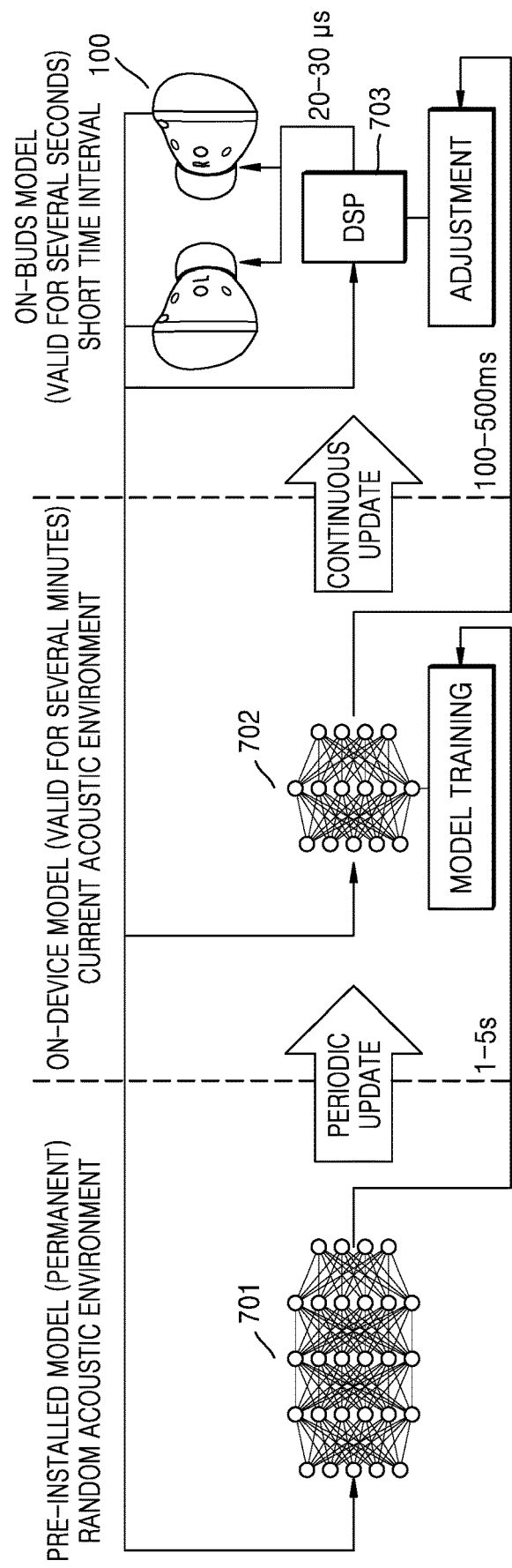
FIG. 7 is a drawing for describing a multi-layer structure of artificial intelligence models configured to process an audio signal, according to an example embodiment of the disclosure.

FIG. 7 is a drawing for describing a multi-layer structure of AI models configured to process an audio signal, according to an example embodiment.

A first AI model 701 may be an AI model having a high complexity and high latency. In an example embodiment of the disclosure, the first AI model 701 may be a versatile model applicable to a random acoustic environment. In an example embodiment of the disclosure, the first AI model 701 may be a state-of-the-art (SoTA) model having high performance. In an example embodiment of the disclosure, the first AI model 701 may be an AI model trained using a large amount of training data in a separate AI model training device. In an example embodiment of the disclosure, the first AI model 701 may be trained in advance and installed in an electronic device configured to process an audio signal.

In an example embodiment of the disclosure, the first AI model 701 may receive an obtained audio signal and output information for training or adapting a second AI model 702. In an example embodiment of the disclosure, because the first AI model 701 is slow and requires many computation resources, the first AI model 701 is not always executed but may be used periodically or once every time an acoustic environment is changed. For example, the first AI model 701 may be executed every 1 to 5 seconds. Obviously, the first AI model 701 is not limited thereto. In an example embodiment of the disclosure, information obtained by the first AI model 701 may be transmitted to update the second AI model 702.

The second AI model 702 may be an AI model having a lower complexity and low latency. In an example embodiment of the disclosure, the second AI model 702 may be a model adapted or trained for a particular user or a current acoustic environment. In an example embodiment of the disclosure, the second AI model 702 may be an on-device model installed in a control device such as a smartphone.

In an example embodiment of the disclosure, the second AI model 702 may be updated to be suitable for a current acoustic environment or user data, by using information transmitted from the first AI model 701. In an example embodiment of the disclosure, the second AI model 702 may be executed periodically or continuously. For example, the second AI model 702 may provide an output every 100 to 500 ms. Obviously, the second AI model 702 is not limited thereto. In an example embodiment of the disclosure, information obtained by the second AI model 702 may be transmitted to adjust a third AI model 703. For example, the second AI model 702 may provide a ground truth signal to the third AI model 703 based on the obtained audio signal and the information transmitted from the first AI model 701.

The third AI model 703 may be an AI model having a low complexity and low latency close to real-time. In an example embodiment of the disclosure, the third AI model 703 may be an AI model trained to perform a particular function in a particular acoustic environment. In an example embodiment of the disclosure, the third AI model 703 may be an on-buds model installed in an audio playback device such as intelligent earphones. For example, the third AI model 703 may be implemented by a DSP.

In an example embodiment of the disclosure, the third AI model 703 may be updated to be valid within a short time interval by using information transmitted from the second AI model 702. In an example embodiment of the disclosure, the updated third AI model 703 may receive the obtained audio signal and output a processed audio signal with low latency close to real-time. For example, the third AI model 703 may have a model latency within about 20 μs or about 30 μs.

Figure 8:
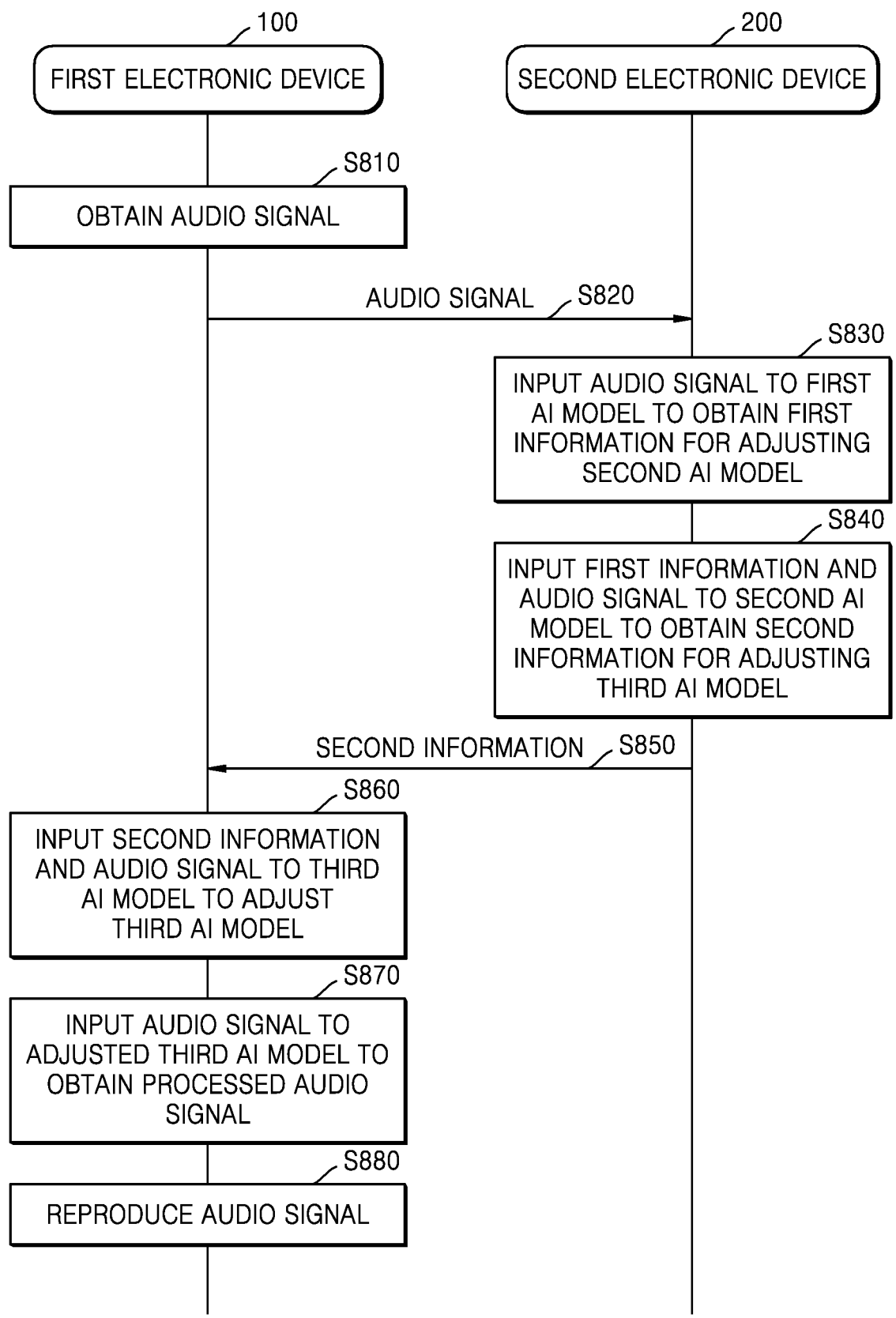
FIG. 8 is a signaling diagram illustrating a method of processing an audio signal, according to an example embodiment of the disclosure.

FIG. 8 is a signaling diagram illustrating a method of processing an audio signal, according to an example embodiment. This method may be executed by the first electronic device 100 and the second electronic device 200 shown in FIGS. 1 and 3 to 6, or an electronic device 100 or a processor 1050 of the electronic device 100 shown in FIG. 10 and an electronic device 200 or a processor 2300 of the electronic device 200 shown in FIG. 11.

In operation S810, the first electronic device 100 may obtain an audio signal. In an example embodiment of the disclosure, the first electronic device 100 may capture a sound outside the first electronic device 100 through a microphone. The microphone may be included in the first electronic device 100. In an example embodiment of the disclosure, the first electronic device 100 may receive an audio signal from the second electronic device 200 or an external other electronic device. In an example embodiment of the disclosure, the first electronic device 100 may mix a plurality of audio signals into at least one audio signal.

In operation S820, the first electronic device 100 may transmit the obtained audio signal to the second electronic device 200.

In operation S830, the second electronic device 200 may input the obtained audio signal to a first AI model to obtain first information for adjusting a second AI model. In an example embodiment of the disclosure, the second electronic device 200 may input the obtained first information to the second AI model to adjust the second AI model.

In an example embodiment of the disclosure, the first AI model may be an AI model configured to process an audio signal offline. In an example embodiment of the disclosure, the first AI model may be an AI model configured to process an audio signal of an arbitrary length. In an example embodiment of the disclosure, the first AI model may be an AI model configured to perform at least one of voice fingerprinting, sound event detection, sound separation, sound enhancement, acoustic scene analysis, or listening target selection. In an example embodiment of the disclosure, the first AI model may be trained in advance and installed in the second electronic device 200.

In an example embodiment of the disclosure, the second AI model may be an AI model configured to process an audio signal with low latency. The second AI model may be an AI model configured to process an audio signal with lower latency than the first AI model. In an example embodiment of the disclosure, the second AI model may be an AI model configured to process an audio signal including a certain number of frames. In an example embodiment of the disclosure, the second AI model may be an AI model configured to perform at least one of selective listening, localized sound event detection, or emergency sound detection. In an example embodiment of the disclosure, the second AI model may be trained in advance and installed in the second electronic device 200.

In an example embodiment of the disclosure, the first information may include information for learning adaptation or environment embedding of the second AI model. In an example embodiment of the disclosure, the first information may include an audio signal processed in the first AI model. In an example embodiment of the disclosure, the first information may include information about a task to be performed in the second AI model. In an example embodiment of the disclosure, the first information may include a target signal to be output from the second AI model to achieve a target function in the second AI model. In an example embodiment of the disclosure, the first information may include information indicating an acoustic environment.

In an example embodiment of the disclosure, the second electronic device 200 may store, in a first buffer of a first size, the audio signal received from the first electronic device 100. For example, the first buffer may store an audio sample corresponding to an audio clip to be input to the first AI model. For example, the first buffer may store an audio sample for a certain time. In an example embodiment of the disclosure, the second electronic device 200 may obtain the first information by inputting the audio signal of the first size, which is stored in the first buffer, to the first AI model. In an example embodiment of the disclosure, the second electronic device 200 may obtain the first information based on fullness of the first buffer. In an example embodiment of the disclosure, the second electronic device 200 may obtain the first information based on detection of a change in an acoustic environment.

In operation S840, the second electronic device 200 may input the obtained first information and the obtained audio signal to the second AI model to obtain second information for adjusting a third AI model.

In an example embodiment of the disclosure, the second information may include an audio signal processed in the second AI model. In an example embodiment of the disclosure, the second information may include information about a task to be performed in the third AI model. In an example embodiment of the disclosure, the second information may include a target signal to be output from the third AI model to achieve a target function in the third AI model. In an example embodiment of the disclosure, the second information may include information indicating the acoustic environment.

In an example embodiment of the disclosure, the second electronic device 200 may store, in a second buffer of a second size, the audio signal received from the first electronic device 100. For example, the second buffer may store an audio sample for calculation of a spectrum to be input to the second AI model, i.e., an audio sample corresponding to a certain time window. In an example embodiment of the disclosure, the second electronic device 200 may obtain the second information by inputting the audio signal of the second size, which is stored in the second buffer, to the second AI model. In an example embodiment of the disclosure, the second electronic device 200 may obtain the second information based on fullness of the second buffer. In an example embodiment of the disclosure, the second electronic device 200 may continuously obtain the second information.

In operation S850, the second electronic device 200 may transmit the obtained second information to the first electronic device 100.

In operation S860, the first electronic device 100 may input the obtained second information and the obtained audio signal to the third AI model to adjust the third AI model.

In an example embodiment of the disclosure, the third AI model may be an AI model configured to process an audio signal in real time. In an example embodiment of the disclosure, the third AI model may be an AI model configured to perform at least one of active noise cancelation, acoustic echo cancelation, ambient pass-though, beamforming, or selective filtering. In an example embodiment of the disclosure, the third AI model may be trained in advance and installed in the first electronic device 100.

In an example embodiment of the disclosure, the first electronic device 100 may train the third AI model by using the second information. In an example embodiment of the disclosure, the third AI model may be trained to process an input audio signal and output the target signal provided as the second information. In an example embodiment of the disclosure, the first electronic device 100 may provide an ambient condition to the third AI model by using the second information.

In an example embodiment of the disclosure, the third AI model may be an AI model configured to extract an audio signal through filtering. In an example embodiment of the disclosure, the first electronic device 100 may input the second information and the obtained audio signal to the third AI model to adjust a filter configured to extract the obtained audio signal through filtering. In an example embodiment of the disclosure, the first electronic device 100 may select at least one of a length or a coefficient of the filter or determine a method of adjusting the filter, based on the second information.

In operation S870, the first electronic device 100 may input the obtained audio signal to the adjusted third AI model to obtain a processed audio signal. In operation S880, the first electronic device 100 may reproduce the processed audio signal.

Figure 9:
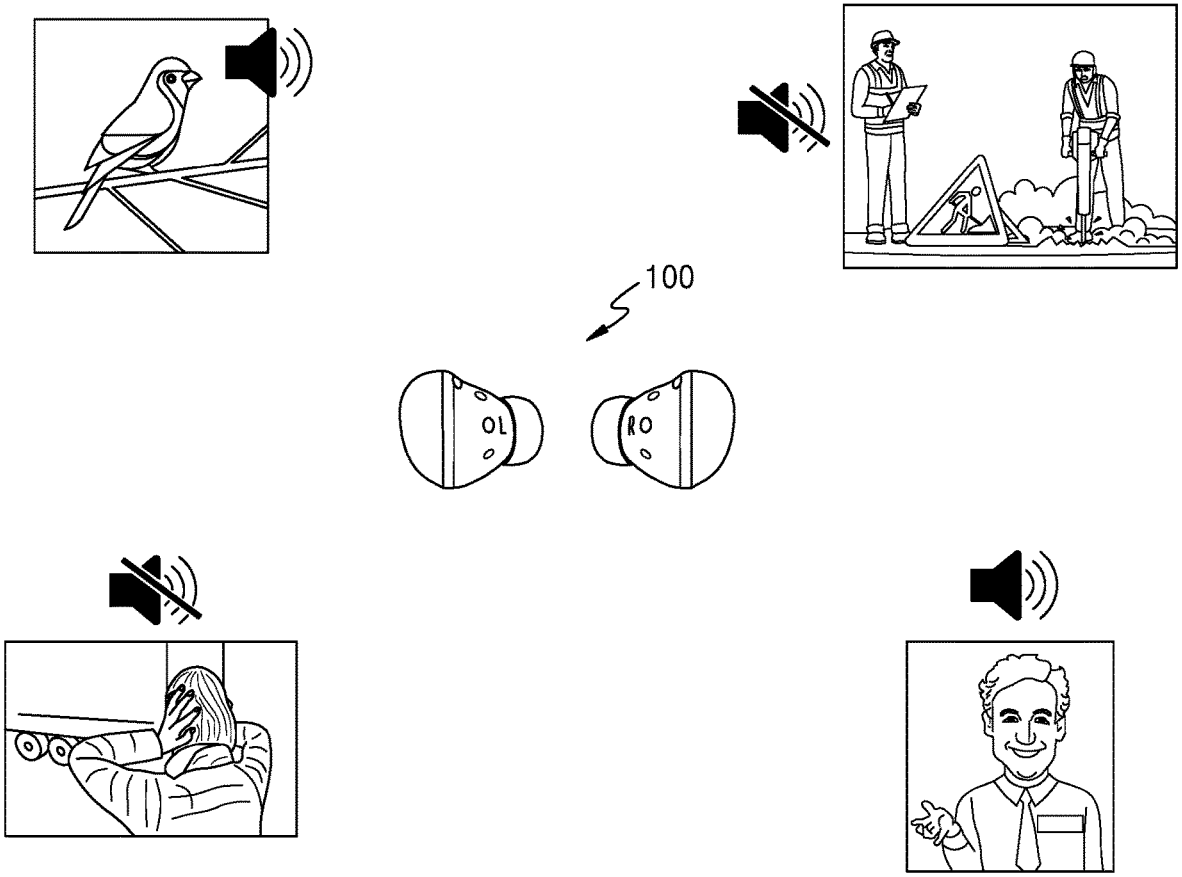
FIG. 9 is a drawing illustrating an example embodiment in which a method of processing an audio signal, according to the disclosure, is used.

FIG. 9 is a drawing illustrating an example embodiment in which a method of processing an audio signal, according to the disclosure, is used.

A user of the first electronic device 100, which is configured to reproduce an audio signal, may be exposed to various sounds in addition to a sound played by the first electronic device 100. For example, ambient sounds such as wind noise and bird calls, noise occurring from a construction site, a transportation means, and the like, sounds such as voices may be heard by being mixed with a sound played by the first electronic device 100. The user may want to select and more clearly listen to only some of the various sounds and cancel the others. For example, the user may want to cancel ambient sounds and noise occurring from the outside of the first electronic device 100 to clearly listen to music played by the first electronic device 100. However, the user may want to clearly hear voices of people and a warning sound such as a horn sound. As another example, the user may want to clearly hear only a voice of a particular speaker in a noisy environment in which there are many people. To enable this selective listening, an audio processing system according to various example embodiments of the disclosure may process an audio signal collected by the first electronic device 100.

In an example embodiment of the disclosure, the user may set, in the audio processing system, categories of sounds which the user wants to hear and sounds which the user does not want to hear. The audio processing system may update AI models to meet the user's configuration and a current acoustic environment, according to various example embodiments of the disclosure. The audio processing system may process in real time audio signals collected by the first electronic device 100, by using the updated AI models.

Figure 10:
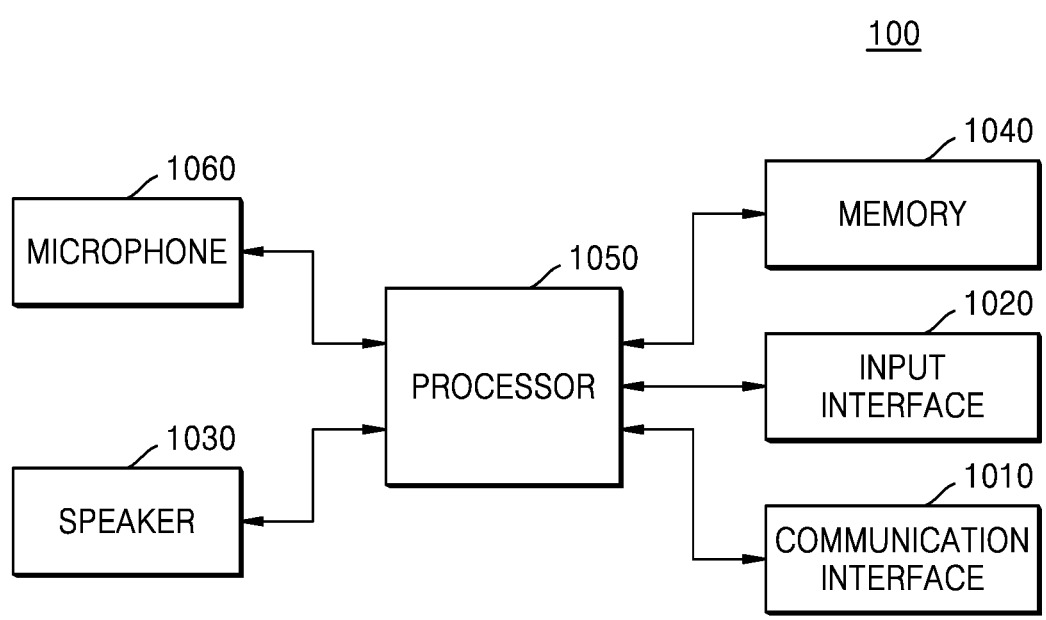
FIG. 10 is a block diagram of an electronic device for reproducing an audio signal, according to various example embodiments of the disclosure.

FIG. 10 is a block diagram of the electronic device 100 for reproducing an audio signal, according to various example embodiments. The electronic device 100 shown in FIG. 10 may correspond to the first electronic device 100 shown in FIGS. 1 and 3 to 7.

As shown in FIG. 10, the electronic device 100 according to an example embodiment of the disclosure may include a communication interface 1010, an input interface 1020, a speaker 1030, a memory 1040, the processor 1050, and a microphone 1060. However, all of the components shown in FIG. 10 are not essential components of the electronic device 100, and the electronic device 100 may be implemented by more or less components than the components shown in FIG. 10. In an example embodiment of the disclosure, the electronic device 100 of FIG. 10 may be implemented as a portion of the electronic device 200 of FIG. 11.

The communication interface 1010 may include one or more components for communicating with an external device. For example, the communication interface 1010 may include a short-range wireless communication interface, a mobile communication interface, and a broadcast receiver.

The input interface 1020 indicates a means through which a user inputs data for controlling the processor 1050. For example, the input interface 1020 may include a keypad, a dome switch, a touch pad (a capacitive overlay touch pad, a resistive overlay touch pad, an infrared beam touch pad, a surface acoustic wave touch pad, an integral strain gauge touch pad, a piezoelectric touch pad, or the like), a jog wheel, a jog switch, and the like but is not limited thereto.

The speaker 1030 may output an audio signal received through the communication interface 1010 or stored in the memory 1040 to the outside of the electronic device 100. The speaker 1030 may reproduce a processed audio signal according to various example embodiments of the disclosure. According to an example embodiment of the disclosure, the electronic device 100 may include a plurality of speakers 1030. In this case, an audio signal having a plurality of different channels (e.g., stereo or 5.1 channel) may be output through some of the plurality of speakers 1030.

The memory 1040 may store programs for processing and control of the processor 1050 and store data input to the electronic device 100 or to be output from the electronic device 100.

In various example embodiments of the disclosure, the memory 1040 may include one or more program modules configured to perform an audio signal processing method according to various example embodiments of the disclosure. In various example embodiments of the disclosure, the memory 1040 may store one or more instructions, and the one or more instructions may be configured to, when executed by the processor 1050, allow the processor 1050 to perform the audio signal processing method according to various example embodiments of the disclosure.

In various example embodiments of the disclosure, the memory 1040 may store at least one AI model configured to process an audio signal. For example, the memory 1040 may store a third AI model configured to process an audio signal in real time. The at least one AI model may be received from the electronic device 200 of FIG. 11, a server, or other external device through the communication interface 1010.

The processor 1050 may commonly control a general operation of the electronic device 100. For example, the processor 1050 may generally control the communication interface 1010, the input interface 1020, the speaker 1030, the memory 1040, the processor 1050, the microphone 1060, and the like by executing programs stored in the memory 1040. An operation of the electronic device 100 according to the disclosure may be controlled by controlling the communication interface 1010, the input interface 1020, the speaker 1030, the memory 1040, the processor 1050, the microphone 1060, and the like.

Particularly, the processor 1050 may be configured to obtain an audio signal through the microphone 1060, transmit the obtained audio signal to the electronic device 200 through the communication interface 1010, receive, from the electronic device 200 through the communication interface 1010, second information for adjusting the third AI model configured to process an audio signal in real time, adjust the third AI model by inputting the obtained second information and the obtained audio signal to the third AI model, obtain a processed audio signal by inputting the obtained audio signal to the adjusted third AI model, and reproduce the processed audio signal through the speaker 1030.

The microphone 1060 receives an external audio signal and processes the external audio signal into electrical audio data. For example, the microphone 1060 may receive an audio signal from an external device or a speaker.

FIG. 11 is a block diagram of the electronic device 200 for processing an audio signal, according to various example embodiments. The electronic device 200 shown in FIG. 11 may correspond to the second electronic device 200 shown in FIGS. 1 and 3 to 6.

As shown in FIG. 11, the electronic device 200 according to some embodiments may include a user input interface 2100, an output interface 2200, the processor 2300, a sensor 2400, a communication interface 2500, an audio/video (NV) input interface 2600, and a memory 2700. However, all of the components shown in FIG. 11 are not essential components of the electronic device 200. The electronic device 200 may be implemented by more or less components than the components shown in FIG. 11.

The user input interface 2100 indicates a means through which a user inputs data for controlling the electronic device 200. For example, the user input interface 2100 may include a keypad, a dome switch, a touch pad (a capacitive overlay touch pad, a resistive overlay touch pad, an infrared beam touch pad, a surface acoustic wave touch pad, an integral strain gauge touch pad, a piezoelectric touch pad, or the like), a jog wheel, a jog switch, and the like but is not limited thereto.

The output interface 2200 may output an audio signal, a video signal, or a vibration signal and may include a display 2210, an acoustic output interface 2220, and a vibration motor 2230.

The display 2210 displays information processed by the electronic device 200. When the display 2210 and a touch pad form a layer structure to configure a touchscreen, the display 2210 may be used as not only an output device but also an input device.

The acoustic output interface 2220 may output audio data received through the communication interface 2500 or stored in the memory 2700. In addition, the acoustic output interface 2220 may output an acoustic signal related to a function (e.g., a call signal reception sound, a message reception sound, or an alarm sound) performed by the electronic device 200. The acoustic output interface 2220 may include a speaker, a buzzer, and the like.

The vibration motor 2230 may output a vibration signal. For example, the vibration motor 2230 may output a vibration signal corresponding to an output of audio data or video data (e.g., a call signal reception sound, a message reception sound, or the like). In addition, the vibration motor 2230 may output a vibration signal when a touch is input through the touchscreen.

The processor 2300 may commonly control a general operation of the electronic device 200. For example, the processor 2300 may generally control the user input interface 2100, the output interface 2200, the sensor 2400, the communication interface 2500, the AN input interface 2600, and the like by executing programs stored in the memory 2700. The processor 2300 may control an operation of the electronic device 2000 of the specification by controlling the user input interface 2100, the output interface 2200, the sensor 2400, the communication interface 2500, the AN input interface 2600, and the like.

Particularly, the processor 2300 may be configured to receive, through the communication interface 2500, an audio signal obtained by an audio signal reproduction device, input the obtained audio signal to a first AI model to obtain first information for adjusting a second AI model configured to process an audio signal with lower latency than the first AI model, input the obtained first information and the obtained audio signal to the second AI model to obtain second information for adjusting a third AI model configured to process an audio signal in real time, and transmit the obtained second information to the audio signal reproduction device through the communication interface 2500.

The sensor 2400 may detect a state of the electronic device 200 or an ambient state of the electronic device 200 and transmit the detected information to the processor 2300.

The sensor 2400 may include at least one of a geomagnetic sensor 2410, an acceleration sensor 2420, a temperature/humidity sensor 2430, an infrared sensor 2440, a gyroscope sensor 2450, a position sensor (e.g., global positioning system (GPS)) 2460, an atmospheric pressure sensor 2470, a proximity sensor 2480, or an RGB (illuminance) sensor 2490 but is not limited thereto. A function of each sensor may be intuitively inferred by those of ordinary skill in the art from a name thereof, and thus, a detailed description thereof is omitted herein.

The communication interface 2500 may include one or more components for communicating with an external device. For example, the communication interface 2500 may include a short-range wireless communication interface 2510, a mobile communication interface 2520, and a broadcast receiver 2530.

The short-range wireless communication interface 2510 may include a Bluetooth communication interface, a Bluetooth low energy (BLE) communication interface, a near-field communication interface, a wireless local area network (WLAN) (Wi-Fi) communication interface, a ZigBee communication interface, an infrared data association (IrDA) communication interface, a Wi-Fi Direct (WFD) communication interface, an ultra wideband (UWB) communication interface, an Ant+ communication interface, and the like but is not limited thereto.

The mobile communication interface 2520 transmits and receives a wireless signal to and from at least one of a base station, an external terminal, or a server in a mobile communication network. Herein, the wireless signal may include a voice call signal, a video call signal, or various types of data according to text/multimedia message transmission and reception.

The broadcast receiver 2530 receives a broadcast signal and/or broadcast related information from the outside through a broadcast channel. The broadcast channel may include a satellite channel and a terrestrial channel. According to implementation examples, the electronic device 200 may not include the broadcast receiver 2530.

In various example embodiments of the disclosure, the communication interface 2500 may transmit and receive data for processing an audio signal to and from the electronic device 100 configured to reproduce an audio signal. In an example embodiment of the disclosure, the communication interface 2500 may receive an audio signal obtained by the electronic device 100 configured to reproduce an audio signal. In an example embodiment of the disclosure, the communication interface 2500 may transmit, to the electronic device 100 configured to reproduce an audio signal, the second information for adjusting the third AI model.

The AN input interface 2600 is to input an audio signal or a video signal and may include a camera 2610, a microphone 2620, and the like. The camera 2610 may obtain an image frame of a still image, a moving picture, or the like through an image sensor in a video call mode or a capturing mode. An image captured through the image sensor may be processed by the processor 2300 or a separate image processor.

The image frame processed by the camera 2610 may be stored in the memory 2700 or transmitted to the outside through the communication interface 2500. Two or more cameras 2610 may be provided according to a configuration aspect of a terminal.

The microphone 2620 receives an external acoustic signal and processes the external acoustic signal into electrical voice data. For example, the microphone 2620 may receive an acoustic signal from an external device or a speaker. The microphone 2620 may use various noise cancellation algorithms for cancelling noise occurred in a process of receiving an external acoustic signal.

The memory 2700 may store programs for processing and control of the processor 2300 and store data input to the electronic device 200 or to be output from the electronic device 200.

The memory 2700 may include at least one type of storage medium among a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), PROM, a magnetic memory, a magnetic disc, and an optical disc.

The programs stored in the memory 2700 may be classified into a plurality of modules according to functions thereof, e.g., a user interface (UI) module 2710, a touchscreen module 2720, an alarm module 2730, and the like.

The UI module 2710 may provide a specified UI, a specified graphics UI (GUI), or the like interoperating with the electronic device 200 for each application. The touchscreen module 2720 may sense a touch gesture of the user on the touchscreen and transmit information regarding the touch gesture to the processor 2300. According to some embodiments of the disclosure, the touchscreen module 2720 may determine and analyze a touch code. The touchscreen module 2720 may be configured by separate hardware including a controller.

The alarm module 2730 may generate a signal for informing of the occurrence of an event of the electronic device 200. The alarm module 2730 may output an alarm signal in a video signal form through the display 2210, an audio signal form through the acoustic output interface 2220, or a vibration signal form through the vibration motor 2230.

In various example embodiments of the disclosure, the memory 2700 may include one or more program modules configured to perform an audio signal processing method according to various example embodiments of the disclosure. In various example embodiments of the disclosure, the memory 2700 may store one or more instructions, and the one or more instructions may be configured to, when executed by the processor 2300, allow the processor 2300 to perform the audio signal processing method according to various example embodiments of the disclosure.

In various example embodiments of the disclosure, the memory 2700 may store at least one AI model configured to process an audio signal. For example, the memory 2700 may store the first AI model configured to process an audio signal offline and the second AI model configured to process an audio signal with lower latency than the first AI model. The at least one AI model may be received from a server or other external device through the communication interface 2500.

In various example embodiments of the disclosure, the memory 2700 may store an obtained audio signal. In an example embodiment of the disclosure, the memory 2700 may store the obtained audio signal in each of a first buffer of a first size and a second buffer of a second size.

According to an example embodiment, a wearable audio output device may include a microphone configured to detect sound; a speaker; a memory storing one or more instructions; and at least one processor functionally coupled to the microphone, the speaker, and the memory. The at least one processor may execute the one or more instructions to obtain audio signal based on the sound detected by the microphone, the audio signal comprising a plurality of first frames, and a plurality of second frames. The at least one processor may transmit the plurality of first frames to an external device, The at least one processor may receive, from the external device, information corresponding to an artificial intelligence model configured to process the plurality of second frames in real time. The at least one processor may update the artificial intelligence model based on the received information. The at least one processor may input the plurality of second frames to the artificial intelligence model to generate a processed audio signal. The at least one processor may output the processed audio signal through the speaker.

On the wearable audio output device, the plurality of first frames may be different from the plurality of second frames.

On the wearable audio output device, the plurality of second frames may be obtained later in time than the plurality of first frames.

On the wearable audio output device, the plurality of first frames may be obtained during a first time period, and the plurality of second frames may be obtained during a second time period after the first time period.

On the wearable audio output device, the wearable audio output device may be one of a hearing device, a earbud or a headphone.

An electronic device according to various example embodiments disclosed in the disclosure may be various types of devices. The electronic device may include, for example, a portable communication device (e.g., a smartphone), a computer device, a portable multimedia device, a portable medical device, a camera, a wearable device, or a home appliance. The electronic device according to an example embodiment of the disclosure is not limited to the devices described above.

It should be understood that the various example embodiments of the disclosure and the terms used herein do not limit the technical features disclosed in the disclosure to particular embodiments but include various modified, equivalent, or replaced ones of a corresponding embodiment. In the description of the drawings, like reference numerals may be used to refer to like elements. A singular form of a noun corresponding to an item may include one or more items unless they are clearly different from each other in context. In the disclosure, each of phrases such as "A or B", "at least one of A and B", "at least one of A or B", "A, B or C", "at least one of A, B and C", and "at least one of A, B or C" may include any one of items listed together in a corresponding phrase among the phrases or all possible combinations of the items. Terms such as "first" and "second" may be simply used to discriminate a corresponding element from another corresponding element and do not limit corresponding elements in another aspect (e.g., significance or order). When it is described that a certain (e.g., first) element is "coupled" or "connected" to another (e.g., second) element together with a term "functionally" or "in a communication way" or without this term, it is indicated that the certain element may be connected to another element directly (e.g., in a wired manner), in a wireless manner, or via a third element in the middle.

A term "module" used in various example embodiments of the disclosure may include a unit implemented by hardware, software, or firmware and may be used compatibly with a term, e.g., logic, logic block, part, or circuit. A module may be an integrally configured part, or a minimum unit of the part or a portion of the minimum unit which performs one or more functions. For example, according to an example embodiment of the disclosure, a module may be implemented in a form of application-specific integrated circuit (ASIC).

Various example embodiments of the disclosure may be implemented by software (e.g., a program #40) including one or more instructions stored in a machine (e.g., an electronic device #01)-readable storage medium (e.g., an internal memory #36 or an external memory #38). For example, a processor (e.g., a processor #20) of the machine (e.g., the electronic device #01) may call at least one instruction among the stored one or more instructions from the storage medium and execute the at least one instruction. This enables the machine to perform at least one function according to the at least one instruction. The one or more instructions may include code generated by a compiler or code executable by an interpreter. The machine-readable storage medium may be provided in a form of non-transitory storage medium. Herein, the term "non-transitory" merely indicates that a storage medium is tangible without including a signal (e.g., an electromagnetic wave), and does not discriminate whether data is semi-permanently or temporarily stored in a storage medium.

According to an example embodiment of the disclosure, methods of the disclosure may be provided by being included in a computer program product. The computer program product may be traded between a seller and a purchaser. The computer program product may be distributed in a form of machine-readable storage medium (e.g., compact disc read only memory (CD-ROM)) or distributed (e.g., downloaded or uploaded) in online through an application store (e.g., PlayStore™) or directly between two user devices (e.g., smartphones). For the online distribution, at least a portion of the computer program product may be at least temporarily stored in a machine-readable storage medium such as memory of a server of a manufacturing company, a server of the application store, or a relay server or temporarily generated.

According to various example embodiments of the disclosure, each element (e.g., a module or a program) among the elements described above may include one or a plurality of entities, and some of the plurality of entities may be separately disposed in another element. According to various example embodiments of the disclosure, one or more elements or operations among the elements described above may be omitted, or one or more other elements or operations may be added. Generally or additionally, a plurality of elements (e.g., modules or programs) may be integrated into a single element. In this case, the integrated element may perform one or more functions of each of the plurality of elements to be the same as or similarly to that performed by a corresponding element among the plurality of elements. According to various example embodiments, operations performed by a module, a program, or different elements may be executed sequentially, in parallel, recursively, or heuristically, one or more of the operations may be executed in a different order or omitted, or one or more other operations may be added.

What is claimed is:

1. A method of processing an audio signal, the method comprising:
    obtaining, by a first electronic device, an audio signal;
    transmitting, by the first electronic device, the obtained audio signal to a second electronic device;
    inputting, by the second electronic device, the obtained audio signal to a first artificial intelligence model to obtain first information for adjusting a second artificial intelligence model configured to process the obtained audio signal with lower latency than the first artificial intelligence model;
    inputting, by the second electronic device, the obtained first information and the obtained audio signal to the second artificial intelligence model to obtain second information for adjusting a third artificial intelligence model configured to process the obtained audio signal in real time;
    transmitting the obtained second information from the second electronic device to the first electronic device;
    inputting, by the first electronic device, the obtained second information and the obtained audio signal to the third artificial intelligence model to adjust the third artificial intelligence model;
    inputting, by the first electronic device, the obtained audio signal to the adjusted third artificial intelligence model to obtain a processed audio signal; and
    reproducing, by the first electronic device, the processed audio signal.

2. The method of claim 1, wherein the first electronic device is a hearable device, and the second electronic device is a mobile device, and the first electronic device and the second electronic device are connected through wireless communication.

3. The method of claim 1,
    wherein the obtaining of the first information comprises:
        storing the obtained audio signal in a first buffer of a first size as first audio data having the first size; and inputting the first audio data, which is stored in the first buffer, to the first artificial intelligence model to obtain the first information, and wherein the obtaining of the second information comprises:

storing the obtained audio signal in a second buffer of a second size as second audio data having the second size, which is smaller than the first size;

inputting the obtained first information to the second artificial intelligence model to adjust the second artificial intelligence model; and inputting the second audio data, which is stored in the second buffer, to the adjusted second artificial intelligence model to obtain the second information.

4. The method of claim 3, wherein the obtaining of the first information is performed based on fullness of the first buffer, and the obtaining of the second information is performed based on fullness of the second buffer.

5. The method of claim 3, wherein the obtaining of the first information is performed based on detection of an acoustic environment, and the obtaining of the second information is continuously performed.

6. The method of claim 1, wherein the adjusting of the third artificial intelligence model comprises inputting the obtained second information and the obtained audio signal to the third artificial intelligence model to adjust a filter configured to extract the obtained audio signal through filtering.

7. The method of claim 6, wherein the adjusting of the filter comprises selecting at least one of a length or a coefficient of the filter based on the second information or determining a method of adjusting the filter.

8. The method of claim 1, wherein the first information comprises information for learning adaptation or environment embedding for the second artificial intelligence model.

9. The method of claim 1, wherein the second information comprises at least one of a target signal for training the third artificial intelligence model, information about an acoustic environment, or information about a task to be performed in the third artificial intelligence model.

10. The method of claim 1, wherein the first artificial intelligence model is configured to perform at least one of voice fingerprinting, acoustic scenes classification, sound event detection, listening target selection, sound separation, sound enhancement, or speech embedding.

11. The method of claim 1, wherein the second artificial intelligence model is configured to perform at least one of selective listening, voice fingerprinting, wake-up spotting, or emergency sound detection.

12. The method of claim 1, wherein the third artificial intelligence model is configured to perform at least one of selective listening, active noise cancellation, acoustic echo cancellation, ambient pass-though, beamforming, or adaptive filtering.

13. A method of processing an audio signal, the method comprising:

receiving, from an audio signal reproduction device, an audio signal obtained by the audio signal reproduction device;

inputting the obtained audio signal to a first artificial intelligence model to obtain first information for adjusting a second artificial intelligence model configured to process the obtained audio signal with lower latency than the first artificial intelligence model;

inputting the obtained first information and the obtained audio signal to the second artificial intelligence model to obtain second information for adjusting a third artificial intelligence model configured to process the obtained audio signal in real time; and transmitting the obtained second information to the audio signal reproduction device to adjust the third artificial intelligence model.

14. The method of claim 13, wherein the obtaining of the first information comprises:

storing the obtained audio signal in a first buffer of a first size as first audio data having the first size; and inputting the first audio data, which is stored in the first buffer, to the first artificial intelligence model to obtain the first information, and wherein the obtaining of the second information comprises:

storing the obtained audio signal in a second buffer of a second size as second audio data having the second size, which is smaller than the first size;

inputting the obtained first information to the second artificial intelligence model to adjust the second artificial intelligence model; and inputting the second audio data, which is stored in the second buffer, to the adjusted second artificial intelligence model to obtain the second information.

15. The method of claim 14, wherein the first artificial intelligence model is trained in advance to process an audio signal of an arbitrary size.

16. The method of claim 14, wherein the second artificial intelligence model is configured to process the obtained audio signal comprising a certain number of frames.

17. The method of claim 14, wherein the obtaining of the first information is performed based on fullness of the first buffer, and the obtaining of the second information is performed based on fullness of the second buffer.

18. The method of claim 14, wherein the obtaining of the first information is performed based on detection of an acoustic environment, and the obtaining of the second information is continuously performed.

* * * * *